(12) United States Patent
Yoo et al.

(10) Patent No.: US 8,094,760 B2
(45) Date of Patent: Jan. 10, 2012

(54) CHANNEL ESTIMATION

(75) Inventors: Taesang Yoo, San Diego, CA (US);
Yongbin Wei, San Diego, CA (US);
Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 693 days.

(21) Appl. No.: 12/191,427

(22) Filed: Aug. 14, 2008

(65) Prior Publication Data
US 2010/0040179 A1 Feb. 18, 2010

(51) Int. Cl.
*H04B 1/10* (2006.01)
(52) U.S. Cl. ...................................................... 375/346
(58) Field of Classification Search .................. 375/232, 375/260, 285, 346–350; 370/210; 708/300, 708/405
See application file for complete search history.

(56) References Cited

U.S. PATENT DOCUMENTS

| | | | |
|---|---|---|---|
| 7,680,026 B2 | 3/2010 | Stopler | |
| 7,864,878 B2 * | 1/2011 | Capozio | 375/269 |
| 2007/0070879 A1 * | 3/2007 | Yoshida et al. | 370/208 |
| 2007/0242782 A1 | 10/2007 | Han et al. | |
| 2010/0046661 A1 * | 2/2010 | Yoshida et al. | 375/285 |

FOREIGN PATENT DOCUMENTS

| | | |
|---|---|---|
| WO | WO2008016325 | 2/2008 |
| WO | WO2008118514 | 10/2008 |

OTHER PUBLICATIONS

Auer Gunther et al: "Comparison of Low Complexity OFDM Channel Estimation Techniques" Proceedings of the 8th International OFDM Workshop, Sep. 24, 2003, pp. 157-161, XP002493214 Hamburg, Germany section 5.
Baoguo Yang et al: "Analysis of Low-Complexity Windowed DFT-Based MMSE Channel Estimator for OFDM Systems" IEEE Transactions on Communications, IEEE Service Center, vol. 49, No. 11, Nov. 1, 2001, XP011010067 Piscataway, NJ, US ISSN: 0090-6778 sections 1-4 abstract.
International Search Report and the Written Opinion—PCT/US2009/053042 International Search Authority—European Patent Office—Mar. 15, 2010.
Invitation to Pay Additional Fees—PCT/US2009/053042, International Search Authority—European Patent Office—Jan. 21, 2010.
Jiann-Ching Guey et al: "Low Complexity Channel Estimation for Minimizing Edge Effects in OFDM Systems" IEEE 65th Vehicular Technology Conference, 2007. VTC2007-Spring, Apr. 1, 2007, pp. 1440-1444, XP031092867 Piscataway, NJ, USA ISBN: 978-1-4244-0266-3 sections 1-4 abstract.

* cited by examiner

*Primary Examiner* — Khanh C Tran
(74) *Attorney, Agent, or Firm* — Kenneth Vu

(57) ABSTRACT

Aspects describe channel estimation in an OFDM system. Baseline DFT-based channel estimation can be performed and scaling can be applied to mitigate distortion in the DFT-based estimations. In some aspects, baseline DFT-based channel estimation can be performed and tones for which DFT-based estimate is deemed unreliable can have MMSE based processing applied locally. If orthogonal sequence is deemed excessive, orthogonal sequence cancellation can be applied prior to the MMSE based processing.

48 Claims, 13 Drawing Sheets

CHANNEL ESTIMATION

BACKGROUND

I. Field

The following description relates generally to wireless communication systems and more particularly to improving performance of channel estimations.

II. Background

Wireless communication systems have become a prevalent means by which a majority of people worldwide have come to communicate. These systems may be multiple-access systems capable of supporting communication with multiple users by sharing the available system resources (e.g., bandwidth and transmit power).

A typical wireless communication system or network (e.g., employing frequency, time, and/or code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of a base station can be interested in receiving one, more than one, or all the data streams carried by the composite stream. Likewise, a mobile terminal can transmit data to the base station and/or another mobile terminal.

In Orthogonal Frequency Division Multiplexing (OFDM) communication systems (e.g., Long Term Evolution (LTE), Ultra Mobile Broadband (UMB), and so forth), channel estimation algorithms include frequency-domain interpolation approach, a Discrete Fourier Transform (DFT) based approach, or a Minimum Mean Square Error (MMSE) based approach. For example, in a DFT-based approach, pilot tones extracted from frequency domain samples are converted to the time domain utilizing Inverse Fast Fourier Transform (IFFT). Time domain truncation, tap-processing, and zero-padding are performed and a conversion back to the frequency domain is conducted using a Fast Fourier Transform (FFT). The process of IFFT, zero-padding, and FFT is equivalent to the optimal sync interpolation in frequency. Thus, the DFT-based approach generally provides better performance compared to direct frequency-domain interpolation approach. MMSE-based approach is generally a better approach in the sense that it determines channel taps in order to minimize the mean-square error. Therefore, the MMSE-based approach generally performs better than the DFT-based approach.

The DFT-based approach can have undesirable performance on a subset of tones (e.g., edge tones, center tones, and so forth) and the MMSE-based approach can have high implementation complexity due to large-size matrix multiplication. Further, both approaches can have problems associated with performance under the presence of other-cell interference using orthogonal sequence (OS). Therefore, there exists a need to overcome the aforementioned as well as other problems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving tones for which channel estimates from a DFT channel estimator is not reliable (e.g., edge tones) and can further improve performance under orthogonal sequence (OS), while maintaining a low complexity feature of an MMSE approach. Various aspects relate to DFT-based algorithm with scaling, DFT-based algorithm with local MMSE and/or DFT-based algorithm with local MMSE and OS cancellation.

An aspect relates to a method of channel estimation. The method comprises performing baseline DFT-based channel estimation on each tone in a system bandwidth to produce an output. The method also comprises calculating a scaling value that represents a distortion amount and applying the scaling value to the output to mitigate the distortion amount.

Another aspect relates to a wireless communications apparatus that comprises a memory and a processor. The memory retains instructions related to performing baseline DFT-based channel estimation on each tone in a system bandwidth to create an output. The memory also retains instructions related to calculating a scaling value that represents a distortion amount and selectively applying the scaling value to mitigate the distortion amount. The processor is coupled to the memory and configured to execute the instructions retained in the memory.

A further aspect relates to an apparatus that comprises a means for performing baseline DFT-based channel estimation to each tone in a system bandwidth to produce an output. Also included in apparatus is a means for calculating a scaling value that represents a distortion amount and a means for selectively applying the scaling value to the output to mitigate the distortion amount.

Still another aspect relates to a computer program product comprising a computer-readable medium. The computer-readable medium comprises a first set of codes for causing a computer to perform baseline DFT-based channel estimation to each tone in a system bandwidth to create an output. Also included is a second set of codes for causing the computer to calculate a scaling value that represents a distortion amount and a third set of codes for causing the computer to apply the scaling value to the created output to mitigate the distortion amount.

Another aspect relates to at least one processor configured to perform channel estimation. The processor comprises a first module for performing baseline DFT-based channel estimation to each tone in a system bandwidth to produce an output. The processor also includes a second module for calculating a scaling value that represents a distortion amount and a third module for selectively applying the scaling value to the output to mitigate the distortion amount.

A further aspect relates to a method for channel estimation. The method comprises performing DFT-based channel estimation on each tone in a system bandwidth and identifying a subset of tones for which DFT-based channel estimate is deemed unreliable. The method also includes selectively applying orthogonal sequence (OS) cancellation and performing MMSE processing on the subset of tones.

Another aspect relates to a wireless communications apparatus comprising a memory and a processor. The memory retains instructions related to performing DFT-based channel estimation on each tone in a system bandwidth and identifying a subset of tones for which DFT-based channel estimate is deemed unreliable. The memory also retains instructions related to selectively applying orthogonal sequence (OS) cancellation and performing MMSE processing on the subset of tones. The processor is coupled to the memory and configured to execute the instructions retained in the memory.

Still another aspect relates to an apparatus that comprises a means for performing DFT-based channel estimation on each tone in a system bandwidth and a means for identifying a subset of tones for which DFT-based channel estimate is deemed unreliable. Also included are a means for selectively applying orthogonal sequence (OS) cancellation and a means for performing MMSE processing on the subset of tones.

A further aspect relates to a computer program product comprising a computer-readable medium. The computer-readable medium comprises a first set of codes for causing a computer to perform DFT-based channel estimation on each tone in a system bandwidth and a second set of codes for causing the computer to identify a subset of tones for which DFT-based channel estimate is deemed unreliable. The computer-readable medium also includes a third set of codes for causing the computer to apply orthogonal sequence (OS) cancellation and a second set of codes for causing the computer to perform MMSE processing on the subset of tones.

Yet another aspect relates to at least one processor configured to perform channel estimation. The processor comprises a first module for performing DFT-based channel estimation on each tone in a system bandwidth and a second module for identifying a subset of tones for which DFT-based channel estimate is deemed unreliable. The processor also includes a third module for applying orthogonal sequence (OS) cancellation if excessive OS is detected and a fourth module for performing MMSE processing on the subset of tones for which DFT-based channel estimation is not reliable.

The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
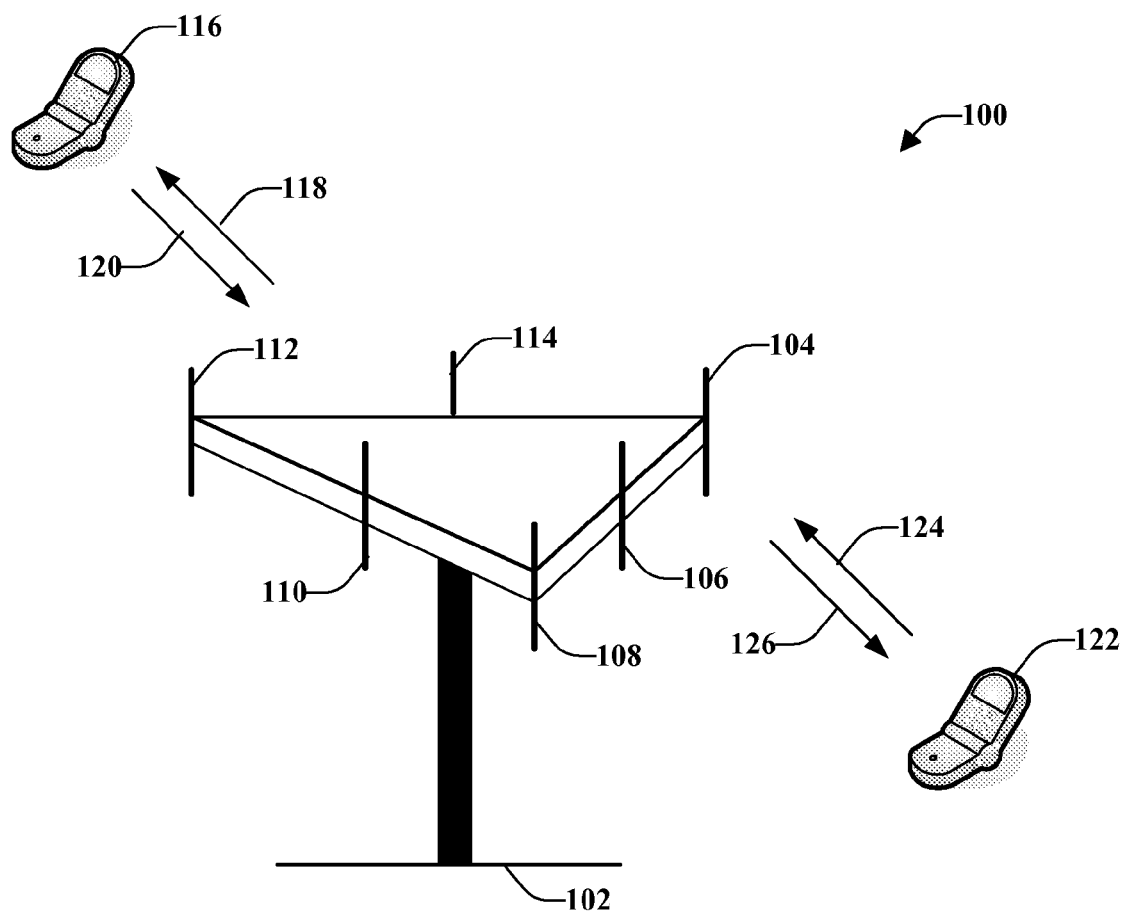
FIG. 1 illustrates a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a multiple access wireless communication system 100 according to one or more aspects is illustrated. A wireless communication system 100 can include one or more base stations in contact with one or more user devices. Each base station provides coverage for a plurality of sectors. A three-sector base station 102 includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 120 and receive information from mobile device 116 over reverse link 118. Forward link (or downlink) refers to the communication link from the base stations to mobile devices, and the reverse link (or uplink) refers to the communication link from mobile devices to the base stations. Mobile device 122 is in communication with antennas 104 and 106, where antennas 104 and 106 transmit information to mobile device 122 over forward link 126 and receive information from mobile device 122 over reverse link 124.

Each group of antennas and/or the area in which they are designated to communicate may be referred to as a sector of base station 102. In one or more aspects, antenna groups each are designed to communicate to mobile devices in a sector or the areas covered by base station 102. A base station may be a fixed station used for communicating with the terminals.

In OFDM systems, a popular approach for channel estimation is a DFT-based algorithm. Typically, channel estimation in OFDM systems requires frequency-domain interpolation of pilot tones regularly spaced in frequency. Among others, DFT-based algorithm performs sinc interpolation, which is an optimal interpolation, through equivalent time-domain processing. More specifically, DFT-based algorithm can have zero-padding in frequency on guard tones, followed by $M_P$-point IFFT, truncation at [−d, D+d] channel taps, zero-padding, thresholding, and M-point FFT. However, the baseline DFT-based approach can have poor performance on a subset of tones (e.g., edge tones, center tones). Alternatively, a full-size MMSE based approach can provide the optimal performance by MMSE estimation of D tap time domain channel, followed by zero-padding, thresholding and M-point FFT. However, the MMSE based approach has high complexity due to large-size matrix multiplications.

In accordance with one or more of the disclosed aspects, improvement of the baseline DFT-based approach can be achieved while maintaining low complexity implementation. An aspect relates to DFT based-algorithm and tone scaling. Another aspect relates to DFT based-algorithm and MMSE (DFT/MMSE) for a subset of tones for which DFT-based channel estimation is deemed unreliable (e.g., local MMSE). DFT based-algorithm and MMSE can provide good channel estimation performance. To address the issue of Orthogonal Sequence (OS), one or more aspects relate to an OS cancellation scheme wherein DFT/MMSE is utilized when OS power is low and DFT/MMSE and OS Cancellation (referred to herein as DFT/MMSE-OSC) is utilized when OS power is high or above a threshold level.

In order to fully appreciate the following detailed description, notations that will be utilized and the meaning of these notions will now be presented. Also presented will be an example value for an OFDM system with 5 MHz system bandwidth, 15 KHz tone spacing, FFT/IFFT size of 512, and 300 useful tones. However, it should be understood that other systems can be utilized and the disclosed aspects are not limited to a 5 MHz bandwidth nor the values presented below.

N=Transmit/Receive Fast Fourier Transform (Tx/Rx FFT) size (e.g., 512).
$N_{OS}$=Oversampling factor (e.g., 8).
$\Omega_p$=Pilot tone spacing in frequency (e.g., 3).
f(k)=Subcarrier index of kth pilot tone (e.g., f(k)=$\Omega_p$k+$k_0$).
$k_0$=Starting pilot tone index.
$\tilde{N}$=Number of tones in an OFDM symbol (e.g., 300).
$\tilde{N}_P$=Number of pilot tones in an OFDM symbol (e.g., 100).
$M_P$=Number of pilot tones for IFFT after padding zeros on guard (e.g., 128 ($\tilde{N}_P \leq M_P \leq N/\Omega_p$)).
M=FFT size for representing time-domain channel taps (e.g., 384 ($\tilde{N} \leq M \leq N$)).
D=Number of channel taps (in terms of M-point FFT) (e.g., 42 (7.3 usec)).
d=Number of negative-delay channel taps (in terms of M-point FFT) (e.g., 5 (0.87 usec)).
$\tilde{N}_E$=Number of edge tones (e.g. 18, 24).
$\tilde{N}_{EP}$=Number of pilot tones to be used for edge MMSE (e.g., 12, 16).
$M_E$=FFT size for edge channel estimation (e.g., 64, 96).
$D_E$=Number of channel taps for edge estimation (in terms of $M_E$-point FFT) (e.g., 8, 11).
$\sqrt{E_s}$=Pilot energy per tone.
C[k]=Channel frequency response at tone k.
V[k]=Noise and interference at tone k.
c[m]=Channel tap at delay m.

Figure 2:
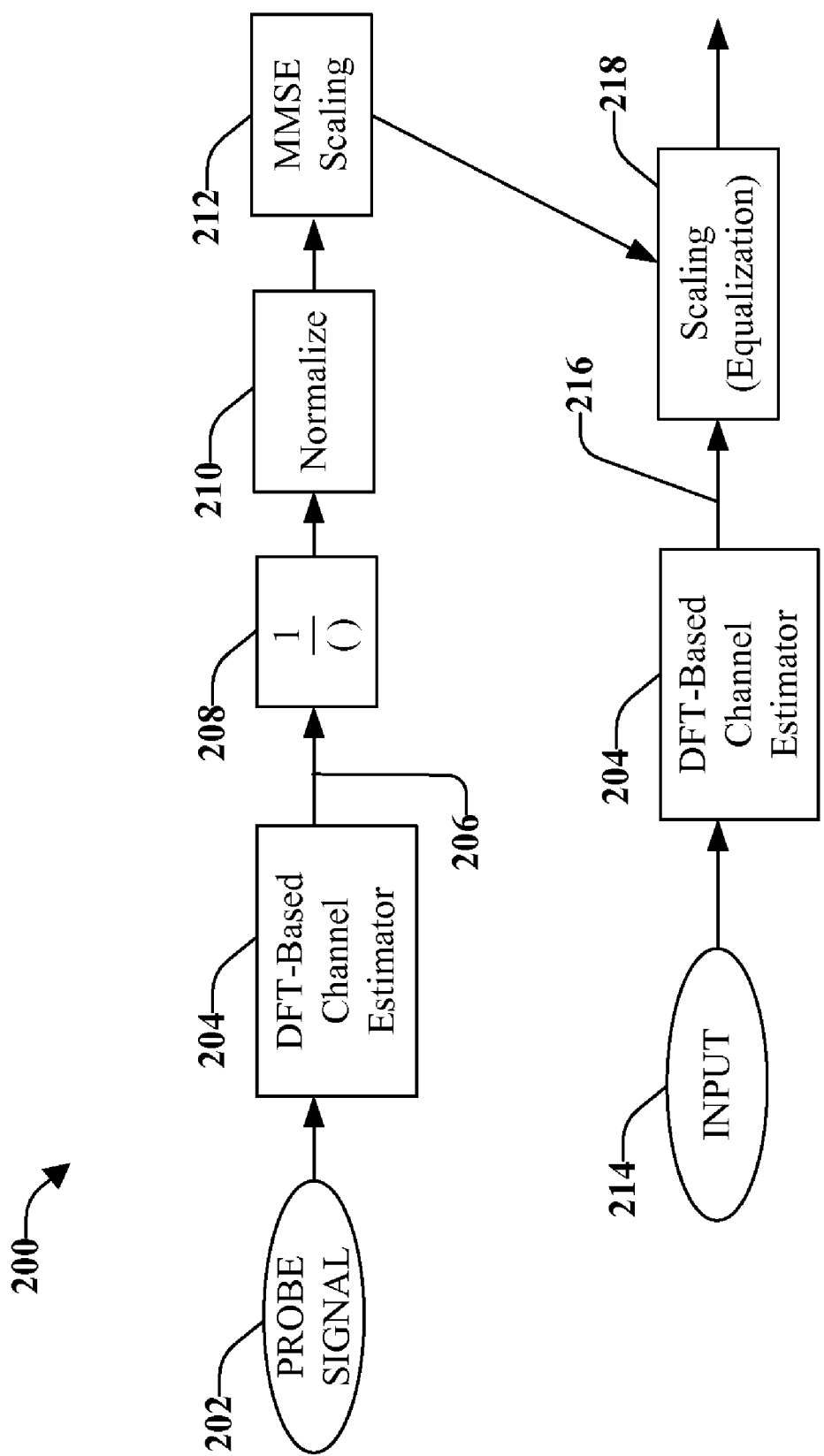
FIG. 2 illustrates a representative schematic of a DFT-based algorithm and scaling system in accordance with an aspect.

With reference now to FIG. 2, illustrated is a representative schematic of a DFT based-algorithm and scaling system 200 in accordance with an aspect. System 200 can reside in a receiver node (e.g., base station, mobile device, and so forth) within a wireless communications network. In a DFT-based approach (which will be described later in this detailed description), tone distortions, which can occur on edge tones, center tones, and other tones, can occur. Such distortion can occur, for example, during a sinc interpolation process (e.g., IFFT to zero padding to FFT), wherein "zero" values are artificially used on guard tones. In accordance with some aspects, center tone channel estimation from a DFT-based algorithm may not be reliable. For example, in some OFDM systems (e.g. LTE), the DC tone is not used and the pilot tones are regularly placed after skipping the DC tone. This can create irregular pilot spacing around the DC tone. In a DFT-based channel estimation algorithm, no special treatment is performed to take care of this irregular pilot spacing, so its performance suffers around the DC tone.

In accordance with an aspect, the tone distortion is mitigated by applying a scaling to an output of a Discrete Fourier Transform (DFT) based channel estimate. The scaling factors are constructed utilizing a probe signal 202 as an input to a DFT-based channel estimator 204. The probe signal 202 can be a known signal that represents a typical input and, thus, a typical output 206 of the DFT-based channel estimator 204 can be calculated. In accordance with some aspects, the probe signal 202 is represented as $$\sqrt{NE_s} \begin{bmatrix} 1 \\ \vdots \\ 1 \end{bmatrix},$$

an all-one signal of dimension $\tilde{N}_P$. If the DFT-based channel estimator 204 were an "ideal" channel estimator, a unit output $$\begin{bmatrix} 1 \\ \vdots \\ 1 \end{bmatrix},$$

an all-one signal of dimension $\tilde{N}$ (e.g., 206) would be produced.

In accordance with some aspects, the probe signal 202 can be designed to be a typical channel frequency response. In accordance with some aspects, for simplicity and robustness, an all-one signal can be utilized, which corresponds to a one tap channel at zero delay (e.g., flat fading).

When the all-one signal is utilizes as the probe signal 202, the output 206 of the DFT-based channel estimator 204 represents a distortion of the probe signal 202 produced by the DFT-based channel estimation. Thus, an inverse 208 of the output 206 is utilized as a post DFT-based channel estimation scaling factor. This value is normalized 210 to remove any bias, and optionally an MMSE Scaling 212 may be applied to mitigate the distortion before being stored as final scaling coefficients into 218. The scaling operation 218 functions as a frequency domain equalizer that can compensate tone distortions. The scaling coefficients can be measured and stored.

In accordance with some aspects, the probe signal 202 can be designed to be a typical channel frequency response. In this case, the inverse 208 is replaced with an appropriate counterpart (e.g., the numerator of the inverse 208 for each tone is replaced with the known desired output at the some tone for the probe signal).

In accordance with some aspects, the MMSE Scaling 212 is represented as:

$$s[k] := \frac{s[k]}{1 + \frac{|s[k]|^2}{SNR}}$$

$$SNR = \frac{E_S}{N_{OS}} \frac{M_P}{D} \frac{1}{\sigma^2}$$

An input 214 that represents an "actual" value is applied to the DFT-based Channel Estimator 204 to produce an output 216. The scaling 218 is applied to the output 216 to mitigate the distortion, if any. For example, for a given input (e.g., probe signal 202) the known desired output is 10 and the "actual" output (206) is 20. Since the actual output is twice the desired output, the scaling equation 218 is 0.5 (normalization 210 and MMSE scaling 212 are ignored here for simplicity purposes). If the input 214 to the DFT-Scaling (DFT-s) Estimator 204 were the same as the probe signal 202, the output (216) will be 20, and the output after scaling (218) will be 10. Thus, the post-scaling operation would perfectly equalize any distortion inherent in the DFT-based channel estimator.

For each tone in the system bandwidth, the scaling value is calculated and each tone can have a different scaling. For tones that have little, if any distortion (e.g., non-edge tones), the scaling can be about 1. In accordance with some aspects, scaling can be applied to all the tones even those tones with little, if any, distortion. However, in accordance with other aspects, scaling is applied locally on only the tones that experience distortion.

Figure 3:
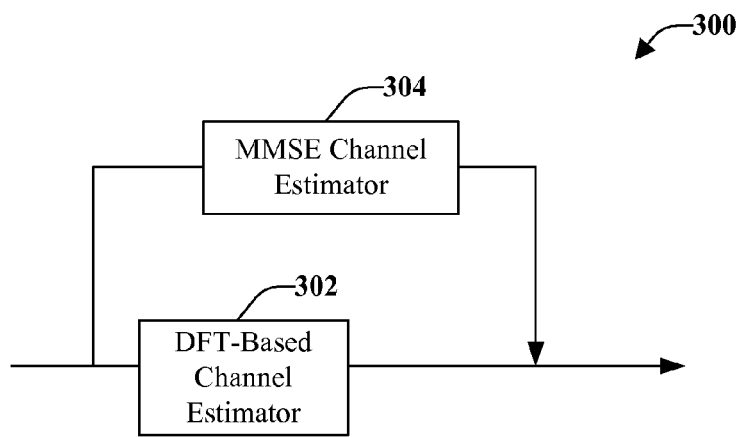
FIG. 3 illustrates a representative schematic of a DFT based-algorithm and MMSE system in accordance with one or more aspects.

FIG. 3 illustrates a representative schematic of a DFT based-algorithm and MMSE system 300 in accordance with one or more aspects. In this approach, small-sized MMSE channel estimations are performed in addition to a baseline DFT-based channel estimation. For example, for edge tone distortion (e.g., for the left side and right side of the bandwidth), two small-sized MMSE channel estimations are performed. System 300 is referred to herein as DFT/MMSE. System 300 can reside in nodes (e.g., base station, mobile device, and so forth) within a wireless communications network.

For at least a subset of the tones, DFT-based channel estimation 302 might be deemed unreliable. Therefore, a MMSE Channel Estimator 304 can perform MMSE-based processing on the tones for which DFT-based processing does not provide a desired accuracy. Performing MMSE on a subset of tones is referred to as local MMSE. Tones for which the DFT-based channel estimation is not reliable can be edge tones (e.g., left and right edge parts), center tones, or other tones.

The estimates for the tones (e.g., edge tones, center tones) from the MMSE Channel Estimator 304 overwrite estimates for the tones from the DFT-based Channel Estimator 302. The other tones for which the DFT-based channel estimator is reliable (e.g., non-edge tones) are not affected by the MMSE channel estimation. The overall complexity of this approach can be minimal since the size of the tones on which MMSE is estimated are small compared with the total number of tones in the bandwidth (e.g., only a subset of all tones). Further information relating to MMSE processing will be provided below.

Figure 4:
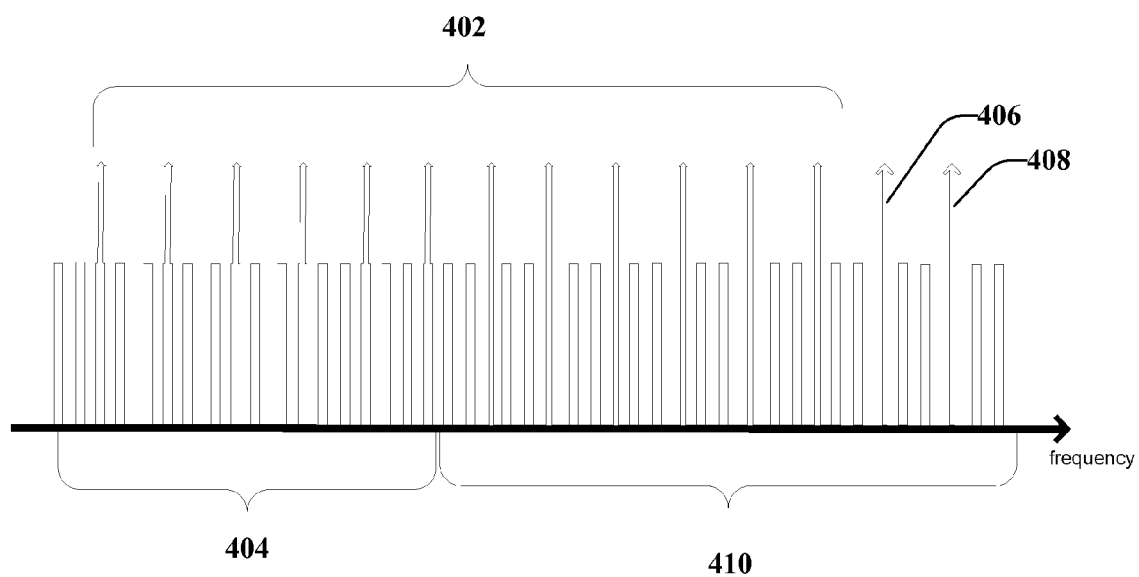
FIG. 4 illustrates a process for small-sized MMSE estimation for edge tones.

FIG. 4 illustrates a process for small-sized MMSE estimation 400 for edge tones, however, it should be understood that this process can be applied to any tones for which the DFT-based channel estimation is deemed unreliable, such as center tones. $\tilde{N}_{EP}$ pilot observations, illustrated by the tall arrows, labeled at 402, are utilized on the edge to estimate channels on $\tilde{N}_E$ edge tones, illustrated by the bars, labeled at 404. Arrows, 406 and 408, are not utilized in this calculation. Further, the bars, labeled at 410, are non-edge tones on which DFT-based processing is utilized. Let $f_E(k)$ denote the tone index of the kth edge pilot.

$$Y_{EP}[k] = Y[f_E(k)]$$
$$= \sqrt{NE_S}\, C[f_E(k)] + V[f_E(k)]$$
$$\equiv \sqrt{NE_S}\, C_{EP}[k] + V_{EP}[k],\ 0 \le k < \tilde{N}_{EP}$$

The pilot observations $Y_{EP}[k]$, $0 \le k < \tilde{N}_{EP}$ are reconstructed using channel taps of a reduced sampling rate (e.g., FFT size of $M_E$) with centered at tone index $k_{E0}$:

$$C_{EP}[k] = \sqrt{\frac{1}{M_E} \sum_{m=0}^{M_E-1} c_E[m] e^{-j2\pi(f(k)-k_{E0})m/M_E}}$$

$$Y_{EP}[k] = \sqrt{NE_S} \left( \sqrt{\frac{1}{M_E} \sum_{m=0}^{M_E-1} c_E[m] e^{-j2\pi(f(k)-k_{E0})m/M_E}} \right) + V_{EP}[k]$$

$$= \sqrt{\frac{NE_S}{M_E}} \sum_{m=0}^{M_E-1} c_E[m] e^{-j2\pi(f(k)-k_{E0})m/M_E} + V_{EP}[k],$$

$$0 \le k < \tilde{N}_{EP}$$

Here, $k_{E0}$ is the tone index, near the center of the edge pilot tones, which can be considered as a "DC" tone for the purpose of edge channel estimation. Using a matrix notation $$y_{EP} = \sqrt{\frac{NE_S}{M_E}} F_E c_E + v_{EP},$$

where $(F_E)_{k,n} = e^{-j2\pi(f_E(k)-k_{E0})n/M_E}$ ($0 \leq k < \tilde{N}_{EP}$). To further simplify, the following approximate assumptions are made. First, $c_E[n]$ is non-zero only for $n=0, \ldots, D_E-1$, where $$D_E = \frac{M_E}{M}(D - d - 1) + 1.$$

Next, all $D_E$ channel taps have similar power and are uncorrelated. Lastly, interference is uncorrelated and similar across all tones. With these assumptions, the covariance matrix of the CIR vector is given by $$A_E = E\{cc^H\} = \frac{1}{N_{OS}D_E} I,$$

and the MMSE channel estimation is:

$$\hat{c} = \frac{1}{\sqrt{N_{OS}}} \frac{1}{D_E} \tilde{F}_E^H \left( \frac{1}{D_E} \tilde{F}_E \tilde{F}_E^H + \Lambda \right)^{-1} y \quad \text{Equation 1}$$

where $$\tilde{F}_E = \sqrt{\frac{N}{M_E}} \sqrt{\frac{E_S}{N_{OS}}} F_E (0 \leq k < \tilde{N}_{EP}, 0 \leq n < D_E).$$

Frequency domain channel estimate can be obtained by taking $M_E$-point FFT: $\hat{C}[k+k_{E0}]=\text{FFT}_{M_E}^k \{\text{zero padded } \hat{c}_E[n]\}$, $-M_E/2 \leq k < M_E/2$, among which only $\tilde{N}_E$ values, illustrated by bars at 404, and overwrite DFT-based channel estimates.

In accordance with some aspects, the MMSE procedure can be represented as a single matrix multiplication. The MMSE procedure is the MMSE estimation filtering by $$\frac{1}{\sqrt{N_{OS}}} \frac{1}{D_E} \tilde{F}_E^H \left( \frac{1}{D_E} \tilde{F}_E \tilde{F}_E^H + \Lambda \right)^{-1},$$

followed by zero-padding, $M_E$-point FFT, and the extraction of $\tilde{N}_E$ values. The single matrix multiplication, which represents the MMSE procedure can be represented as $\hat{C}_{edge} = G \cdot y_{EP}$, $(G:\tilde{N}_E \times \tilde{N}_{EP})$.

In accordance with some aspects, the matrix G can be calculated offline and stored in a storage media, such as memory, for a few representative SNR values $$\frac{E_S}{N_{OS}}$$

and/or channel length $D_E$. When MMSE processing is to be conducted, the actual SNR value can be calculated and the matrix having the closest SNR value can be utilized.

Figure 5:
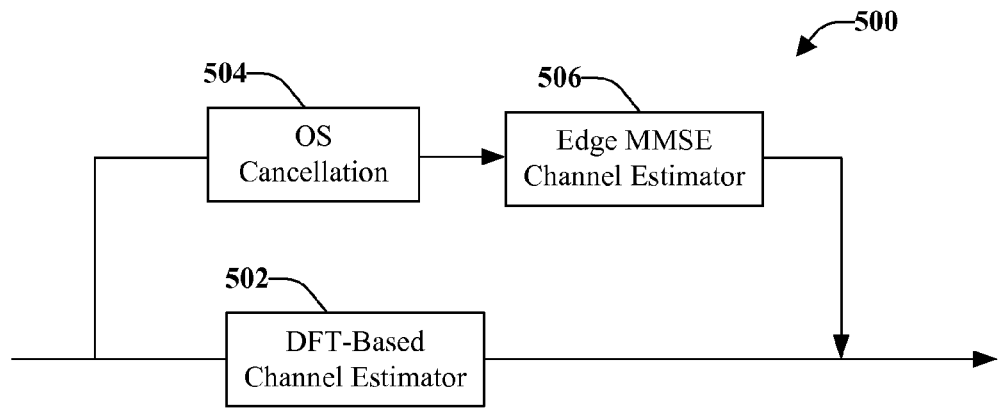
FIG. 5 illustrates a schematic representation of a system for Orthogonal Sequence (OS) cancellation in accordance with various aspects disclosed herein.

With reference now to FIG. 5, illustrated is a schematic representation of a system 500 for Orthogonal Sequence (OS) cancellation in accordance with various aspects disclosed herein. System 500 can reside in nodes (e.g., base station, mobile device, and so forth) within a wireless communications network. In a wireless communication network, base stations can utilize different pilot signal choices so that the mobile terminals can distinguish signals from different base stations. For example, each base station may use one of $N_{OS}$ available OSs, where these OSs are designed such that pilots with different OS can be distinguished from one another. The channel estimation process is responsible for differentiating pilot signals received from its serving cell from neighboring cells. However, neither DFT-based algorithm nor DFT/MMSE can completely remove the OS from neighboring cells. These residual OS pilots can interfere with the channel estimation process and limit decoding performance, whose effect is especially severe on some of the tones (e.g., edge tones). Therefore, the effect of OS on tone estimations should be mitigated as much as possible. OS cancellation can mitigate the signal received from the neighboring base stations, thus, when a receiver node attempts to estimate its channel, mitigation of the signal from the neighboring base stations can improve signal estimation.

OS cancellation can be utilized at substantially the same time as MMSE to further improve channel estimation performance of DFT/MMSE in the presence of OS on tones for which DFT-based algorithm is deemed unreliable (e.g., edge tones, center tones, and so forth).

System 500 includes a DFT-based channel estimator 502 that can perform DFT based channel estimation processing (which will be explained in further detail below). There are some tones for which DFT based processing is deemed unreliable and, therefore, as discussed above, MMSE based processing can be performed on the subset of tones for which DFT based processing is deemed unreliable. However, if the experienced OS is above a threshold level, which can be a predetermined value, OS cancellation is applied by an OS Cancellation Module 504 prior to processing though an MMSE Channel Estimator 506. The OS cancellation module 504 cancels out of the pilot observation before MMSE channel estimation 506 is performed. Tones for which DFT-based estimates are deemed reliable are determined based on the baseline DFT-based channel estimator 502 and are not affected by the OS and MMSE process. The OS cancellation module 504 can cancel the OS based on the MMSE estimation as follows.

It should be noted that the following equations are for illustration purposes only and can relate to LTE, however, other equations can be utilized depending on the type of system utilized. As the first step of the OS cancellation, the observable channel taps (both desired channel taps as well as interfering taps from OS) are estimated by utilizing the following a priori channel statistics:

$$\{A\}_{k,k} = \begin{cases} \exp\left(-\frac{3n}{D-d}\right), & n \geq 0 \\ \exp\left(\frac{3n}{d}\right), & n < 0 \end{cases}$$

where $$n = k - c \text{ and } c = \max_m \left\{ \left\lfloor \frac{mM_P}{3} \right\rfloor : m = 1, 2, 3, k \geq \left\lfloor \frac{mM_P}{3} \right\rfloor - d \right\}.$$

Figure 6:
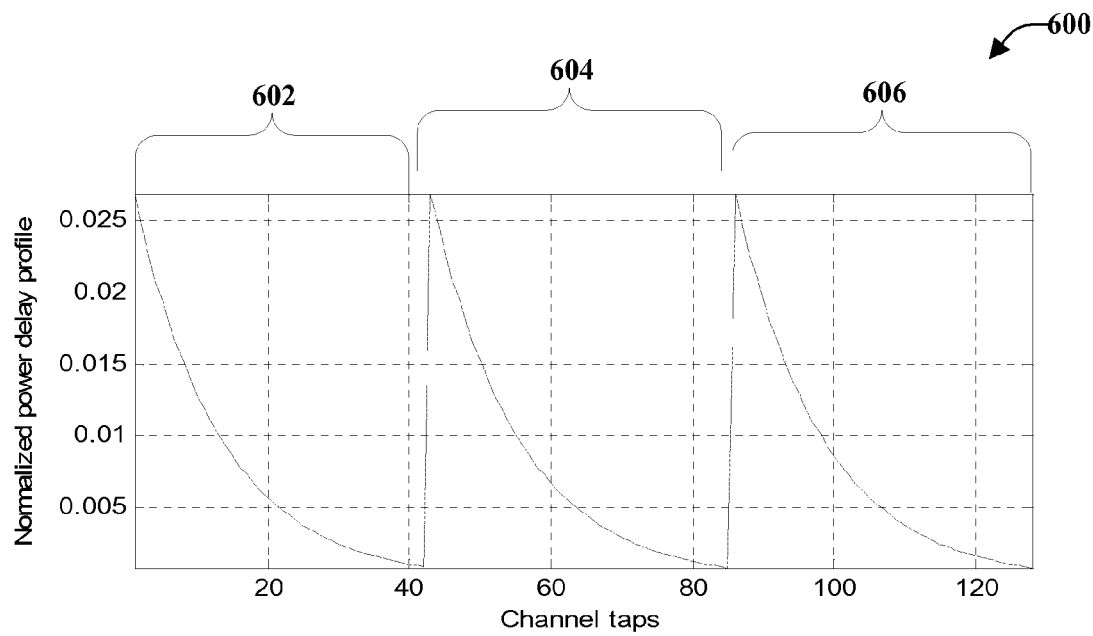
FIG. 6 illustrates a plot that represents the a priori channel statistics.

The normalized a priori channel statistics $\tilde{A}$, shown in the plot of FIG. 6, are obtained by scaling A such that $\text{tr}(\tilde{A})=1$. It should be noted that the above channel stations represent only one aspect of possible implementations. The above equation and the shape of FIG. 6 are not fundamental to OS cancellation, as other equations and shapes can be utilized in accordance with the disclosed aspects. Additionally, the above equation assumes that there exists three distinct OSs in the system. However, in accordance with some aspects, there can be K peaks, where K is an integer. One peak can be from the serving cell and K−1 can be from neighboring cells.

FIG. 6 illustrates a plot 600 that represents the a priori channel statistics. In OS cancellation, processing is performed to convert the frequency domain signal to a time domain signal and a filter is applied to the time domain signal. After applying the filter, the OS signal may be similar to the illustrated plot 600. The first peak 602 represents the signal from the serving base station. The other signals 604 and 606, of which only two are shown, represent the signals that belong to the OS from the neighboring base stations. The other signals 604 and 606 can be cancelled or removed from the equation such that only the peak 602 belong to the serving base station is converted to the frequency domain. The other signals 604 and 606 represent interference from the other base stations. Thus, if there are n OS peaks (where n is an integer) only one of the peaks will be from the serving base station and the other peaks are mismatched OS.

With this, the time domain impulse response is obtained as:

$$\hat{c}_{desired+OS} = E\{cy^H\}E\{yy^H\}^{-1}y$$
$$= \frac{1}{\sqrt{N_{OS}}}\tilde{A}\tilde{F}^H(\tilde{F}\tilde{A}\tilde{F}^H + \Lambda)^{-1}y$$

where $$\tilde{F} = \sqrt{\frac{N}{M}}\sqrt{\frac{E_S}{N_{OS}}}F, \; (0 \leq k < \tilde{N}_P, 0 \leq n < M_P)$$

with $F_{k,n} = e^{-j2\pi(\Omega_p k + k_0)n/M}$, $(0 \leq k \leq \tilde{N}_P - 1)$.

The impulse response contains both the desired channel taps and the OS. Next, only the OS part is chosen by applying the truncation window $$W_{OS} = \text{diag}\{\underbrace{0,\ldots 0}_{D-d}, \underbrace{1,\ldots,1}_{M_{P-D}}, \underbrace{0,\ldots 0}_{d}\}: \hat{c}_{OS} = W_{OS}\hat{c}_{desired+OS}.$$

The corresponding frequency response on the edge pilot tones is obtained by taking M-point DFT, or equivalently, $$\hat{C}_{OS,EP} = F_{OS,EP}\hat{c}_{OS},$$

where $F_{OS,EP}$ is a sub-matrix (subset of rows and columns) of the M×M DFT matrix $$\left(\text{e.g., } \{F_{OS,EP}\}_{k,n} = \frac{1}{\sqrt{M}}e^{-j2\pi(f_E(k)+k_0)n/M},\right.$$
$$\left. 0 \leq k < 2\tilde{N}_{EP}, 0 \leq n < M_P\right)$$

Finally, the OS part of the pilot observation is then given by:

$$y_{OS,EP} = \sqrt{NE_S}\hat{C}_{OS,EP} \quad \text{Equation 2}$$
$$= \sqrt{\frac{NE_S}{N_{OS}}}F_{OS,EP}W_{OS}\tilde{A}\tilde{F}^H(\tilde{F}\tilde{A}\tilde{F}^H + \Lambda)^{-1}y$$
$$\equiv G_{OS,EP}y.$$

and the desired part of the edge pilot observation is given by:

$$y_{desired,EP} = y_{EP} - y_{OS,EP} \quad \text{Equation 3}$$
$$= \left(\begin{bmatrix} I & 0 & 0 \\ 0 & 0 & I \end{bmatrix} - G_{OS,EP}\right)y$$
$$\equiv G_{desired,EP}y.$$

After the OS portion is cancelled out, the MMSE channel estimation 506 is performed, as described above, with $y_{EP}$ replaced by $y_{desired,EP}$.

In accordance with some aspects, pre-processing can be performed to mitigate the amount of processing that has to be performed in real-time for each tone. For preprocessing, the OS cancellation procedure can be represented as a single matrix multiplication $G_{desired,EP}$, which has a dimension $2\tilde{N}_{EP} \times \tilde{N}_P$. The matrix $G_{desired,EP}$ can be calculated offline and stored in a storage media (e.g. memory) for a few representative SNR values $$\frac{E_S}{N_{OS}}.$$

In accordance with the aspects that utilize pre-processing, several SNR and/or several channel types are pre-calculated off-line and the metrics are stored. Depending on a current measurement, a pre-calculated metric can be retrieved and applied. The metric to choose can be determined based on the measured SNR and/or the measured channel length and the closest pre-calculated metric is chosen.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
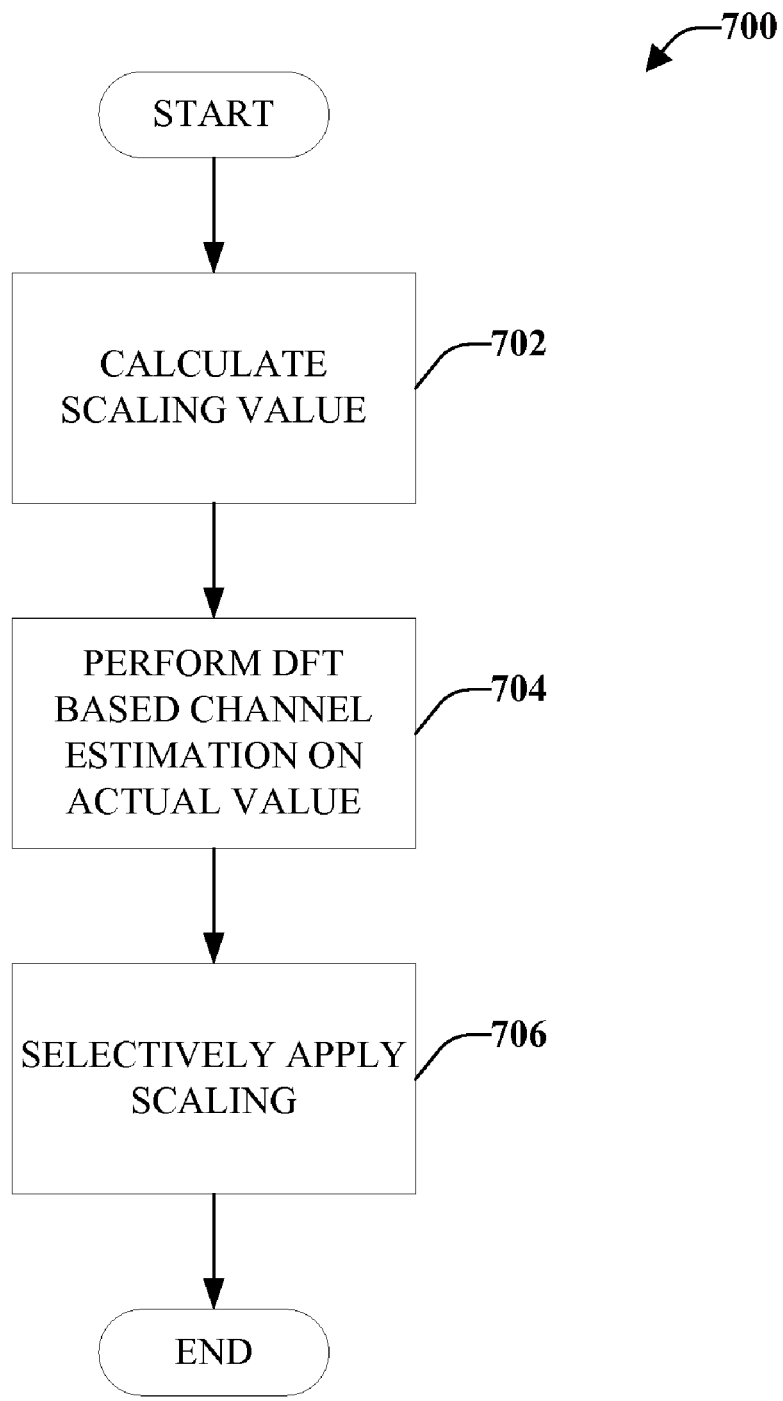
FIG. 7 illustrates a method for performing a DFT based-algorithm and Scaling for channel estimation.

FIG. 7 illustrates a method 700 for performing a DFT based-algorithm and Scaling for channel estimation. Method 700 starts at 702, when a scaling value is calculated for each tone in a system bandwidth. The calculation of scaling values can include using a probe signal as an input to a DFT-based channel estimation to calculate an output. The probe signal is a typical channel frequency response and the output represents distortion produced by the DFT-based channel estimation. The inverse of the output is normalized and MMSE scaling is utilized to obtain a the scaling value, which can be used as a post DFT-based channel estimation scaling factor. In accordance with some aspects, one or more scaling values are pre-measured and stored.

At 704, DFT-based channel estimation is performed on actual input values. Scaling is selectively applied to the output of the DFT-based channel estimation, at 706, to mitigate the distortion, if any. Thus, for each tone in the system bandwidth the scaling value is calculated and each tone can have a different scaling. For tones that have little, if any distortion (e.g., non-edge tones), the scaling can be about 1. In accordance with some aspects, scaling can be applied to all the tones even those tones with little, if any, distortion. However, in accordance with other aspects, scaling is applied locally on only the tones that experience distortion (local scaling).

In accordance with some aspects, pre-calculations are performed to simplify the real-time calculations. Pre-calculation includes pre-measuring one or more scaling coefficients and storing the one or more scaling coefficients.

Figure 8:
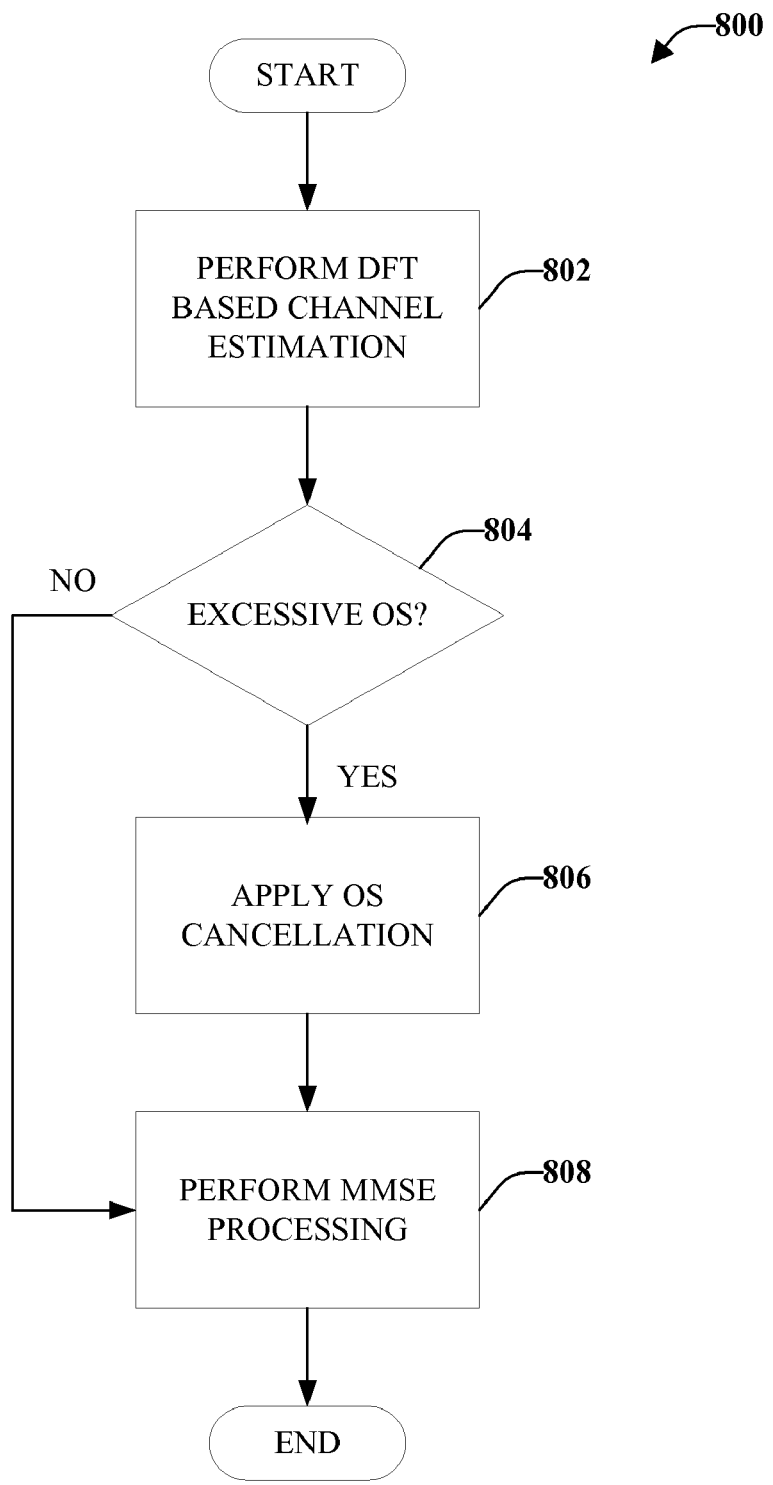
FIG. 8 illustrates a method for utilizing a DFT based-algorithm and MMSE (with or without OS cancellation) for channel estimations.

With reference now to FIG. 8, illustrated is a method 800 for utilizing a DFT based-algorithm and MMSE (with or without OS cancellation) for channel estimations. Small-sized MMSE channel estimations are performed in addition to a baseline DFT-based channel estimation. The MMSE channel estimation can be performed on tones for which DFT-based channel estimation is deemed to be unreliable. OS cancellation can be utilized at substantially the same time as MMSE to further improve channel estimation performance of DFT/MMSE in the presence of OS on tones for which DFT-based estimate is deemed unreliable (e.g., edge tones, center tones, and so forth).

Method 800 starts, at 802, when DFT-based channel estimation is performed on the tones. For at least a subset of the tones, DFT-based channel estimation might be deemed unreliable. Therefore, MMSE-based processing can be performed on the tones for which DFT-based processing does not provide a desired accuracy. Performing MMSE on a subset of tones is referred to as local MMSE. Tones for which the DFT-based channel estimator is not reliable can be edge tones (e.g., left and right edge parts), center tones, or other tones. In accordance with some aspects, the tones for which DFT-based processing is deemed reliable do not have MMSE based processing applied.

At 804, a determination is made whether there is excessive OS in the communications network. OS can introduce errors or other problems during tone estimation and, therefore, the effect of OS on tone estimation should be mitigated as much as possible. If there is excessive OS ("YES"), at 806, OS cancellation is applied. OS cancellation can mitigate the signal received from the neighboring base stations, thus, when a receiver node attempts to estimate its channel, mitigation of the signal from the neighboring base stations can improve signal estimation. Method 800 continues, at 808, where MMSE processing is performed.

If there is no excessive OS ("NO") (or after OS cancellation is applied), at 808, MMSE processing is performed, such as by an MMSE Channel Estimator. The estimates for the tones (e.g., edge tones, center tones) from the MMSE Channel Estimator overwrites estimates for those tones from the DFT-based Channel Estimator. The other tones for which the DFT-based channel estimator is reliable (e.g., non-edge tones) are not affected by the MMSE channel estimation. The overall complexity of this approach can be minimal since the size of the tones on which MMSE is estimated are small compared with the total number of tones in the bandwidth (e.g., only a subset of all tones).

In accordance with some aspects, MMSE processing can be performed offline and stored in a storage media for a few representative SNR values and/or channel lengths. According to some aspects, the OS cancellation procedure can be pre-calculated off-line and the metrics stored for later retrieval and application. The metric to retrieve can be determined based on a measured SNR and/or a measured channel length and the pre-calculated metric is chosen that matches (or most closely matches) the SNR and/or channel length.

In order to fully appreciate, the disclosed aspects, a system model will now be described. This system model considers an OFDM symbol with oversampling by a factor of $N_{OS}$ $$x_o[n] = \frac{1}{\sqrt{N_{OS}N}} \sum_{k=-\frac{\tilde{N}}{2}}^{\frac{\tilde{N}}{2}-1} \sqrt{E_S}\, X[k] e^{j2\pi kn/N_{OS}N},$$

$$n = 0, \ldots N_{OS}N - 1,$$

and a subchip-level channel impulse response (CIR) $c_o[n]$ (n=0, ..., $N_{OS}D-1$). The signal X[k] is non-zero only within $-\tilde{N}/2 \le k \le \tilde{N}/2-1$. The received signal, after down-sampling by $N_{OS}$, is given by $$y[n] = y_o[N_{OS}n] = \sum_{m=0}^{N_{OS}D-1} c_o[m]x[N_{OS}n - m] + v[N_{OS}n]$$

Taking N-point FFT, results in:

$$Y[k] = FFT_N\{y[n]\}$$

$$= \frac{1}{\sqrt{N}} \sum_{n=0}^{N-1} \sum_{m=0}^{N_{OS}D-1} c_o[m] x_o[N_{OS}n - m] e^{-j2\pi kn/N} +$$

$$FFT_N^k\{v[N_{OS}n]\}, -\frac{N}{2} \le k \le \frac{N}{2} - 1$$

$$= \frac{1}{\sqrt{N}} \sum_{n=0}^{N-1} \sum_{m=0}^{N_{OS}D-1} c_o[m] \frac{1}{\sqrt{N_{OS}N}} \sum_{l=-\frac{\tilde{N}}{2}}^{\frac{\tilde{N}}{2}-1} \sqrt{E_S}\, X[l]$$

$$e^{j2\pi l(N_{OS}n-m)/N_{OS}N} e^{j2\pi kn/N} + V[k], -\frac{N}{2} \le k \le \frac{N}{2} - 1$$

$$= \frac{1}{\sqrt{N}} \sum_{m=0}^{N_{OS}D-1} c_o[m]$$

$$\sum_{l=-\frac{\tilde{N}}{2}}^{\frac{\tilde{N}}{2}-1} \sqrt{E_S}\, e^{-j2\pi lm/N_{OS}N} \left( \frac{1}{\sqrt{N_{OS}N}} \sum_{n=0}^{N-1} \sqrt{E_S}\, X[l] e^{j2\pi(l-k)n/N} \right) +$$

-continued $$V[k], -\frac{N}{2} \le k \le \frac{N}{2}-1$$

$$= \begin{cases} \sqrt{\frac{E_S}{N_{OS}}} \sum_{m=0}^{N_{OS}D-1} c_o[m]e^{-j2\pi km/N_{OS}N}X[k]+V[k], -\frac{\tilde{N}}{2}2 \le k \le \frac{\tilde{N}}{2}-1 \\ V[k], \text{otherwise} \end{cases}$$

$$= \begin{cases} \sqrt{NE_S}\left(\sqrt{\frac{1}{N_{OS}N}} \sum_{m=0}^{N_{OS}D-1} c_o[m] e^{-j2\pi km/N_{OS}N}\right)X[k]+V[k], -\frac{\tilde{N}}{2} \le k \le \frac{\tilde{N}}{2}-1 \\ V[k], \text{otherwise} \end{cases}$$

$$= \begin{cases} \sqrt{NE_S}\,C[k]X[k]+V[k], -\frac{\tilde{N}}{2} \le k \le \frac{\tilde{N}}{2}-1 \\ V[k], \text{otherwise} \end{cases}$$

where $C[k]$ ($-\tilde{N}/2 \le k \le \tilde{N}/2-1$), the $N_{OS}N$-point FFT of $c_o[n]$ ($n=0, \ldots, N_{OS}D-1$), represents the channel gain on k th tone. Using the M-point IFFT of $C[k]$ ($-\tilde{N}/2 \le k \le \tilde{N}/2-1$), the above can be represented in terms of the re-sampled CIR $c[n]$ ($n=0, \ldots, M-1$) as $$Y[k] = \sqrt{NE_S}\left(\sqrt{\frac{1}{M}} \sum_{m=0}^{M-1} c[m]e^{-j2\pi km/M}\right)X[k]+V[k],$$

$$-\frac{\tilde{N}}{2} \le k \le \frac{\tilde{N}}{2}-1$$

$$= \sqrt{\frac{NE_S}{M}} \sum_{m=0}^{M-1} c[m]e^{-j2\pi km/N}X[k]+V[k],$$

$$-\frac{\tilde{N}}{2} \le k \le \frac{\tilde{N}}{2}-1$$

Considering only pilot tones, $$Y_p[k] = Y[f(k)]$$

$$= Y[\Omega_p k + k_0]$$

$$= \sqrt{\frac{NE_S}{M}} \sum_{m=0}^{M-1} c[m]e^{-j2\pi(\Omega_p k+k_0)m/M} +$$

$$V[\Omega_p k + k_0], 0 \le k \le \tilde{N}_P - 1$$

Using a matrix notation $$y = \sqrt{\frac{NE_S}{M}} Fc + v$$

where $F_{k,n} = e^{j2\pi(\Omega_p k + k_0)n/M}$ ($0 \le k \le \tilde{N}_P - 1$).

Figure 9:
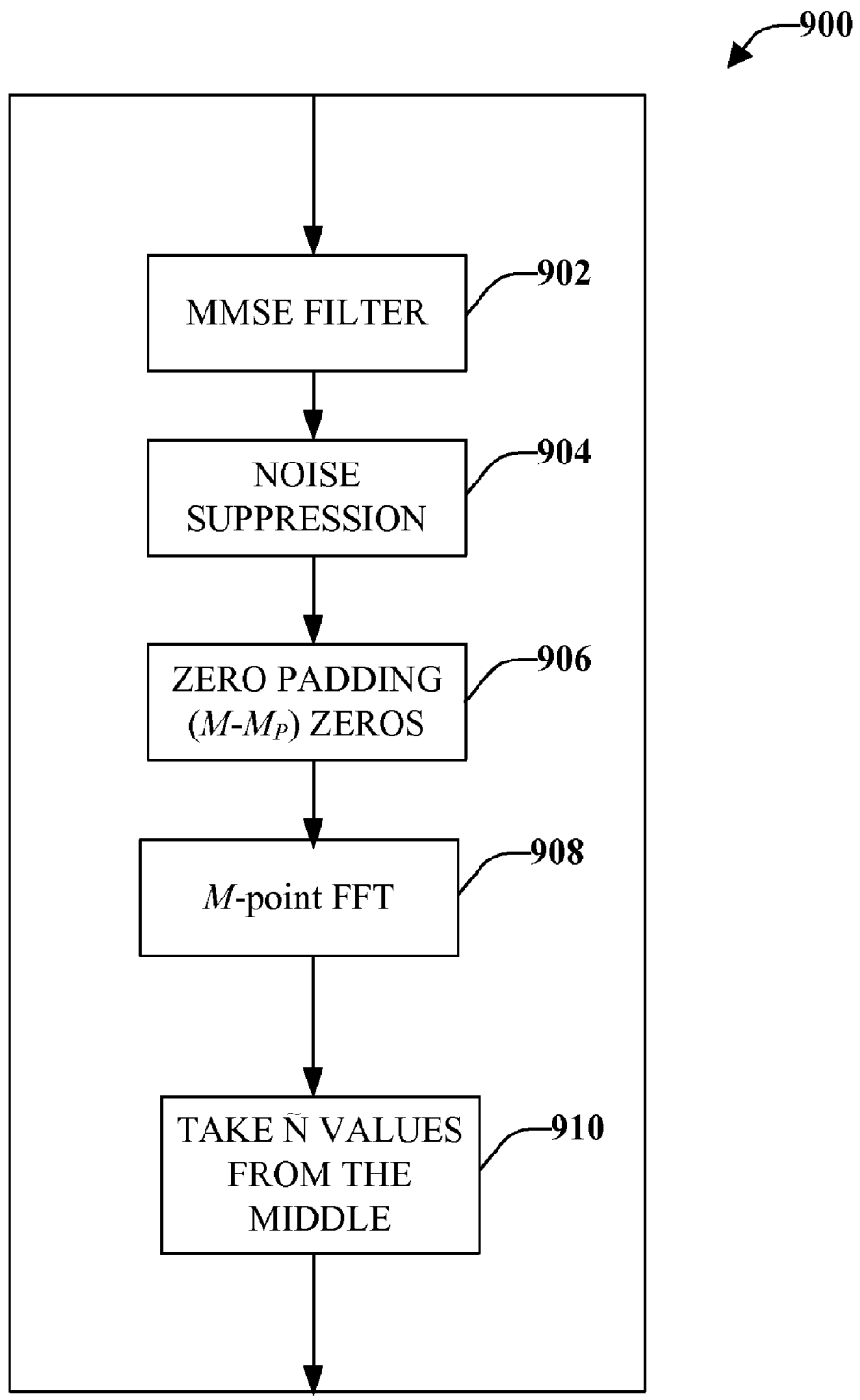
FIG. 9 illustrates an MMSE channel estimator that can be utilized in accordance with one or more of the disclosed aspects.

FIG. 9 illustrates an MMSE channel estimator 900 that can be utilized in accordance with one or more of the disclosed aspects. MMSE channel estimator 900 can include an MMSE filter 902. For MMSE channel estimation, the following assumption can apply: $c[n]$ is non-zero only for $n=0, \ldots, D-1$ and all D channel taps have equal power and are uncorrelated. It should be understood that these assumptions are only one aspect of possible implementation of MMSE channel estimator and these assumptions are utilized here for example purposes. With these assumptions, the covariance matrix of the CIR vector is given by:

$$A = E\{cc^H\} = \frac{1}{N_{OS}D}I,$$

and the MMSE CIR estimation is $$\hat{c} = E\{cy^H\}E\{yy^H\}^{-1}y \qquad \text{Equation 4}$$

$$= \sqrt{\frac{NE_S}{M}}\,AF^H\left(\frac{NE_S}{M}FAF^H + \Lambda\right)^{-1}y$$

$$= \frac{1}{\sqrt{N_{OS}}}\tilde{A}\tilde{F}^H\left(\tilde{F}\tilde{A}\tilde{F}^H + \Lambda\right)^{-1}y$$

$$= \frac{1}{\sqrt{N_{OS}}}\frac{1}{D}\tilde{F}^H\left(\frac{1}{D}\tilde{F}\tilde{F}^H + \Lambda\right)^{-1}y.$$

where $\tilde{A} = N_{OS}A$ is the normalized a priori channel statistics such that $\text{tr}(\tilde{A})=1$, and $$\tilde{F} = \sqrt{\frac{N}{M}}\sqrt{\frac{E_S}{N_{OS}}}F, (0 \le k < \tilde{N}_P, 0 \le n < D).$$

After $\hat{c}$ is obtained, such as by MMSE filter 902, noise suppression 904 is performed on $\hat{c}$. Zero padding: (M–$M_p$) zeros 906. A frequency domain channel estimate is obtained by taking an M-point FFT 908:
$\hat{C}[k] = \text{FFT}_M^k\{\text{zero padded } c[n]\}$. The $\tilde{N}$ values from the middle are taken, at 910.

Figure 10:
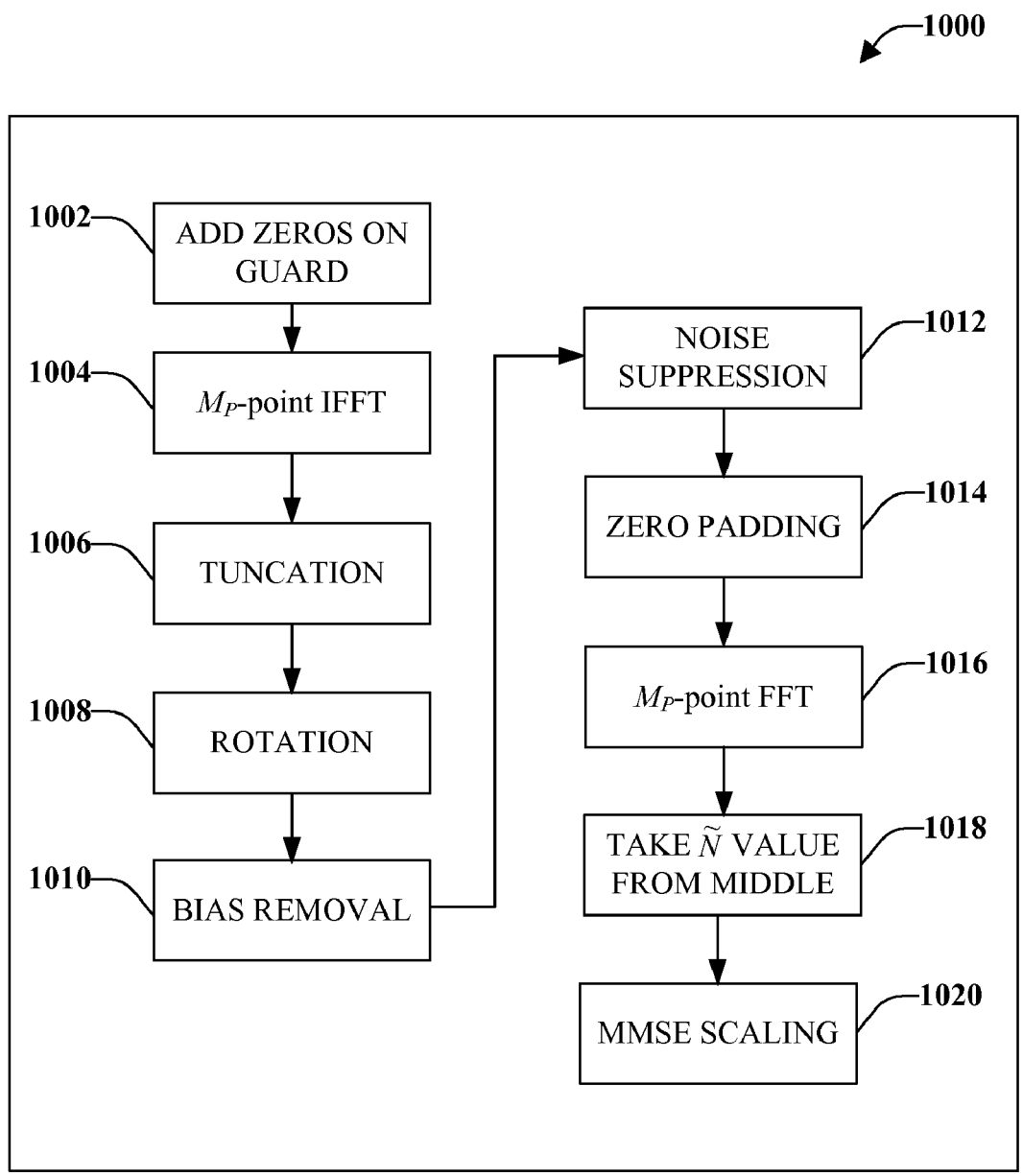
FIG. 10 illustrates a DFT based channel estimation algorithm.

FIG. 10 illustrates a DFT-based channel estimator 1000 where, d represents the number of negative-delay channel taps. Allowing negative-delay taps is utilized for the performance of DFT-based channel estimators. Although DFT-based channel estimation works well in the middle of the system band, it has poor performance near edges, because adding zeros on guards results in the blurring of CIR.

At 1002, zeros are added on guard: $(M_P - \tilde{N}_P)/2$ zeros on each edge. $M_P$-point IFFT is performed, at 1004. Truncation $[-d, D-d-1]$ is performed at 1006. At 1008, is rotation:

$$\exp(j2\pi k_{offset} n/M), k_{offset} = f\left(\frac{\tilde{N}_P}{2}\right) - \frac{N}{2}.$$

At 1010 is Bias removal:

by $\frac{1}{NE_s}\frac{M}{M_P}.$

Noise suppression, at 1012 followed by zero padding (M–$M_P$) zones, at 1014. At 1016, M-point FFT is performed and at 1018, the $\tilde{N}$ values are taken from the middle. Optional MMSE scaling by $$\frac{SNR}{1+SNR}, SNR = \frac{E_S}{N_{OS}}\frac{M_P}{D}\frac{1}{\sigma^2},$$

is performed at 1020.

Figure 11:
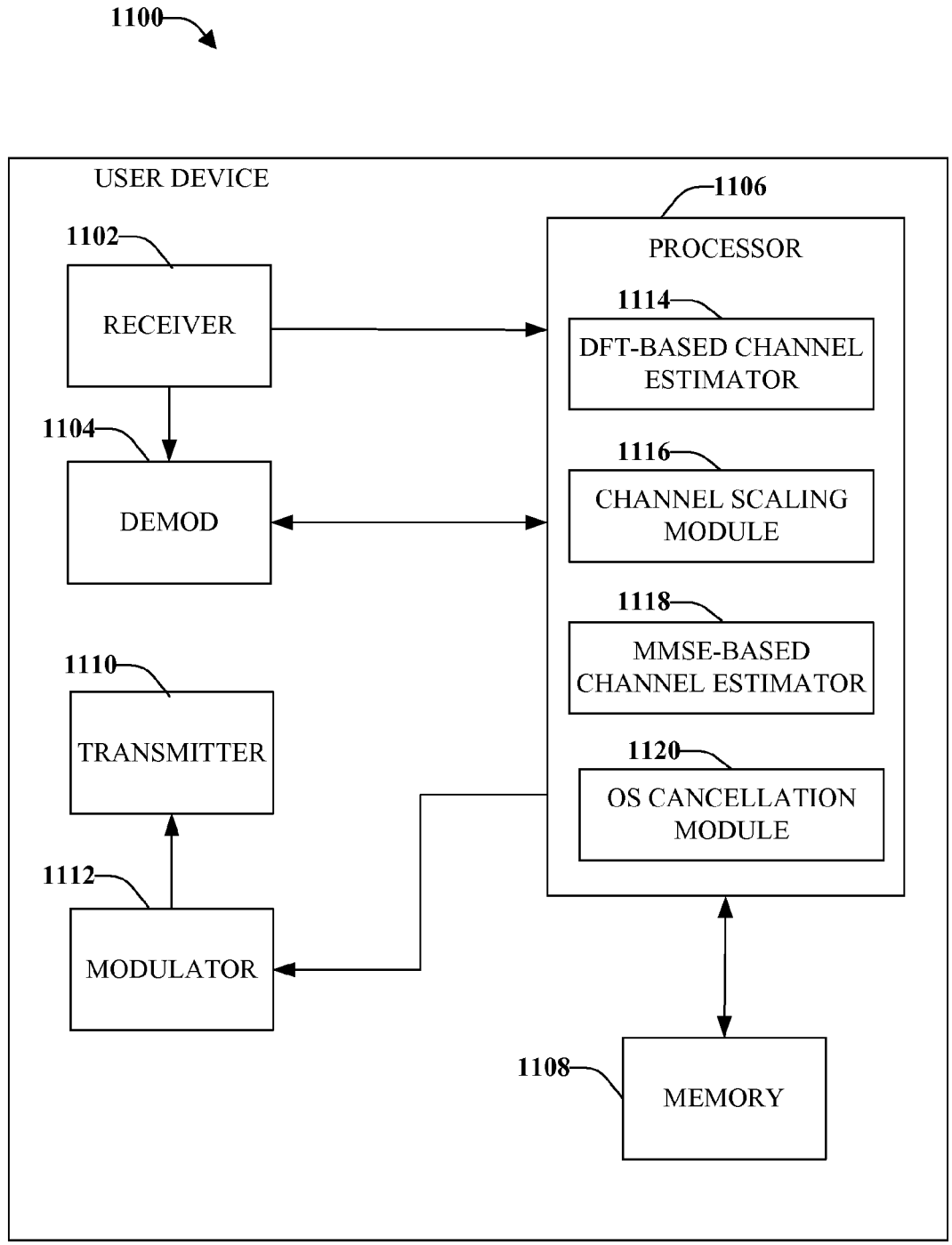
FIG. 11 illustrates a system that facilitates channel estimation in accordance with one or more of the disclosed aspects.

With reference now to FIG. 11, illustrated is a system 1100 that facilitates channel estimation in accordance with one or more of the disclosed aspects. System 1100 can reside in a user device. System 1100 comprises a receiver 1102 that can receive a signal from, for example, a receiver antenna. The receiver 1102 can perform typical actions thereon, such as filtering, amplifying, downconverting, etc. the received signal. The receiver 1102 can also digitize the conditioned signal to obtain samples. A demodulator 1104 can obtain received symbols for each symbol period, as well as provide received symbols to a processor 1106.

Processor 1106 can be a processor dedicated to analyzing information received by receiver component 1102 and/or generating information for transmission by a transmitter 1108. In addition or alternatively, processor 1106 can control one or more components of user device 1100, analyze information received by receiver 1102, generate information for transmission by transmitter 1108, and/or control one or more components of user device 1100. Processor 1106 may include a controller component capable of coordinating communications with additional user devices.

User device 1100 can additionally comprise memory 1108 operatively coupled to processor 1106 and that can store information related to coordinating communications and any other suitable information. Memory 1108 can additionally store protocols associated with sample rearrangement. It will be appreciated that the data store (e.g., memories) components described herein can be either volatile memory or non-volatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and/or methods is intended to comprise, without being limited to, these and any other suitable types of memory. User device 1100 can further comprise a symbol modulator 1112 and a transmitter 1110 that transmits the modulated signal.

In accordance with some aspects, processor 1106 can include a DFT-based channel estimator 1114 that performs DFT-based channel estimation and a channel scaling module 1116 that performing scaling on each tone in a system bandwidth to produce an output. Additionally, processor 1106 can include a MMSE-based channel estimator 1118 that can apply MMSE based processing for a subset of tones for which DFT-based estimate is deemed unreliable. Additionally or alternatively, processor 1106 can include an OS cancellation module 1120 that can mitigate the amount of OS experienced due to non-serving base stations. It should be understood that although DFT-based channel estimator, scaling module 1116, MMSE-based channel estimator 1118, and OS cancellation module 1120 are illustrated and described as included in processor 1106, in accordance with some aspects, these modules can be located external to processor 1106.

Figure 12:
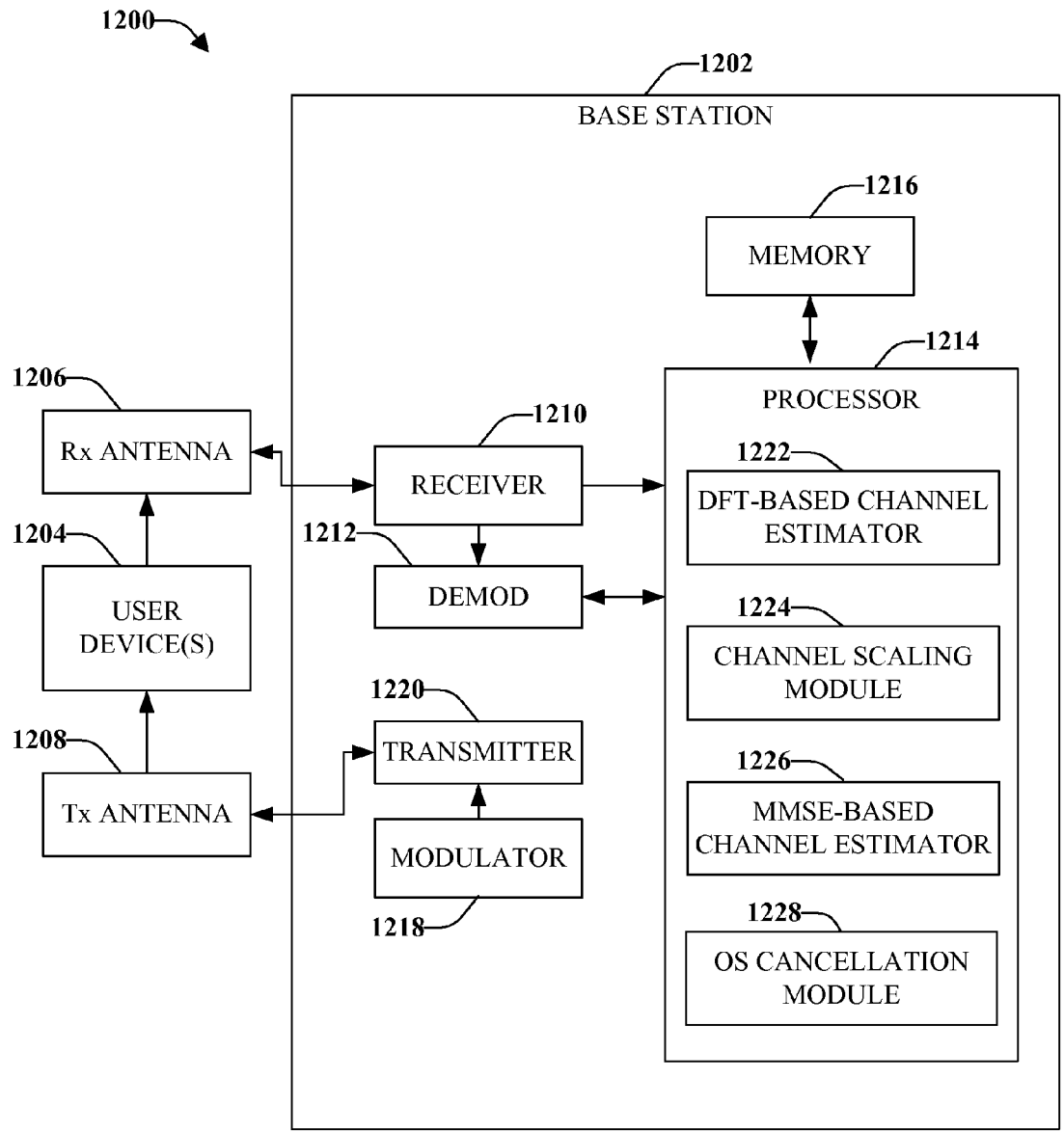
FIG. 12 is an illustration of a system that facilitates channel estimation in accordance with various aspects presented herein.

FIG. 12 is an illustration of a system 1200 that facilitates channel estimation in accordance with various aspects presented herein. System 1200 comprises a base station or access point 1202. As illustrated, base station 1202 receives signal(s) from one or more user devices 1204 by a receive antenna 1206, and transmits to the one or more user devices 1204 through a transmit antenna 1208.

Base station 1202 comprises a receiver 1210 that receives information from receive antenna 1206 and is operatively associated with a demodulator 1212 that demodulates received information. Demodulated symbols are analyzed by a processor 1214 that is coupled to a memory 1216 that stores information related to broadcast-multicast waveforms embedded in a unicast waveform. A modulator 1218 can multiplex the signal for transmission by a transmitter 1220 through transmit antenna 1208 to user devices 1204.

In accordance with some aspects, processor 1214 includes an DFT-based channel estimator 1222 that performs channel estimation on each tone in a system bandwidth. Also included is a channel scaling module 1224 that performs scaling on tones. Additionally, processor 1214 include a MMSE-based channel estimator 1226 that can apply MMSE based estimation for a subset of tones for which DFT-based estimate is deemed unreliable. Additionally or alternatively, processor 1214 can include an OS cancellation module 1228 that can mitigate the amount of OS experienced due to other base stations. It should be understood that although DFT-based channel estimator 1222, channel scaling module 1224, MMSE-based channel estimator 1226, and OS cancellation module 1228 are illustrated and described as included in processor 1214, these modules can be located external to processor 1214.

Figure 13:
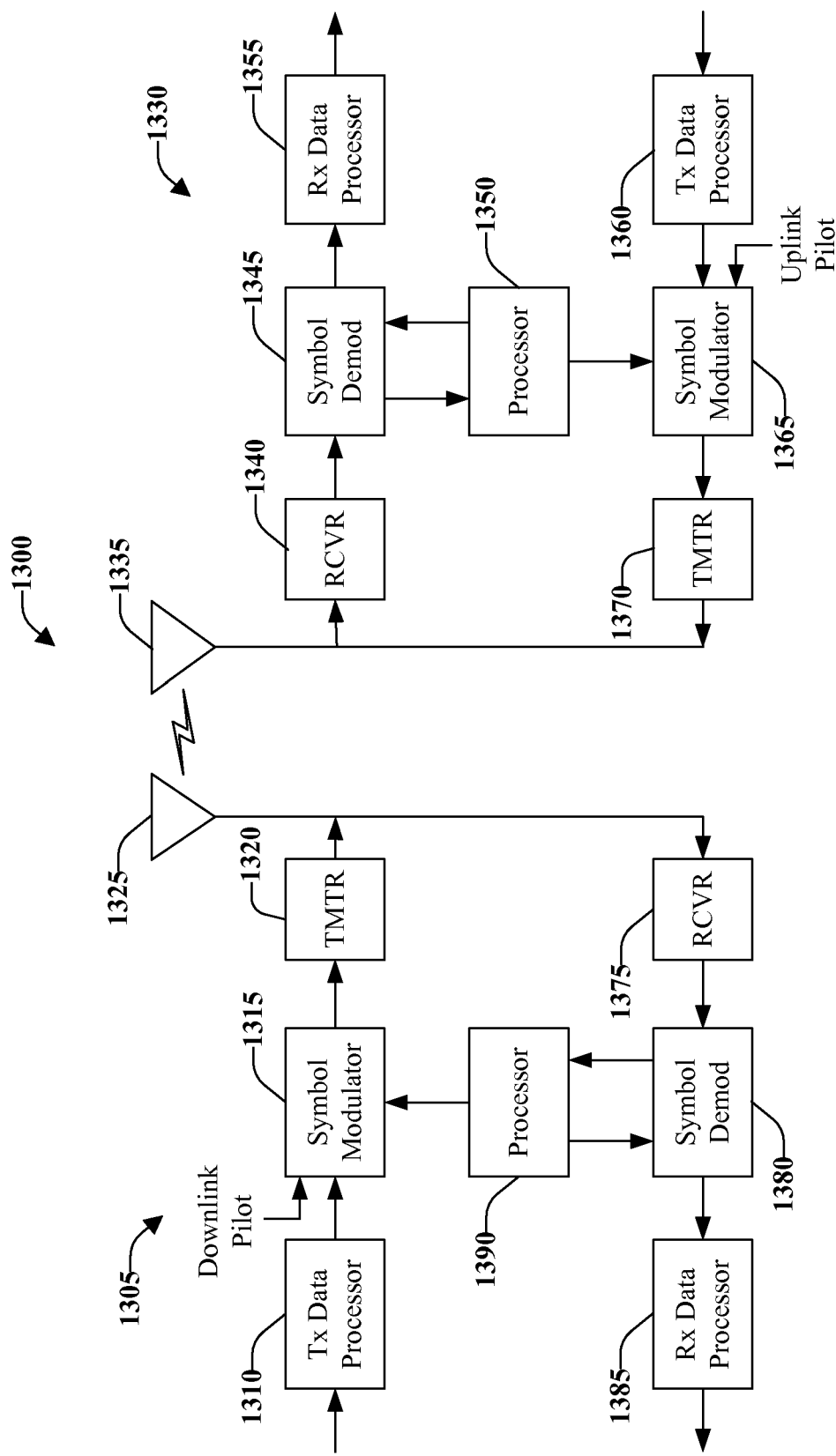
FIG. 13 illustrates an exemplary wireless communication system.

FIG. 13 illustrates an exemplary wireless communication system 1300. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink.

Processors 1390 and 1350 direct (e.g., control, coordinate, manage, . . . ) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1390 and 1350.

Figure 14:
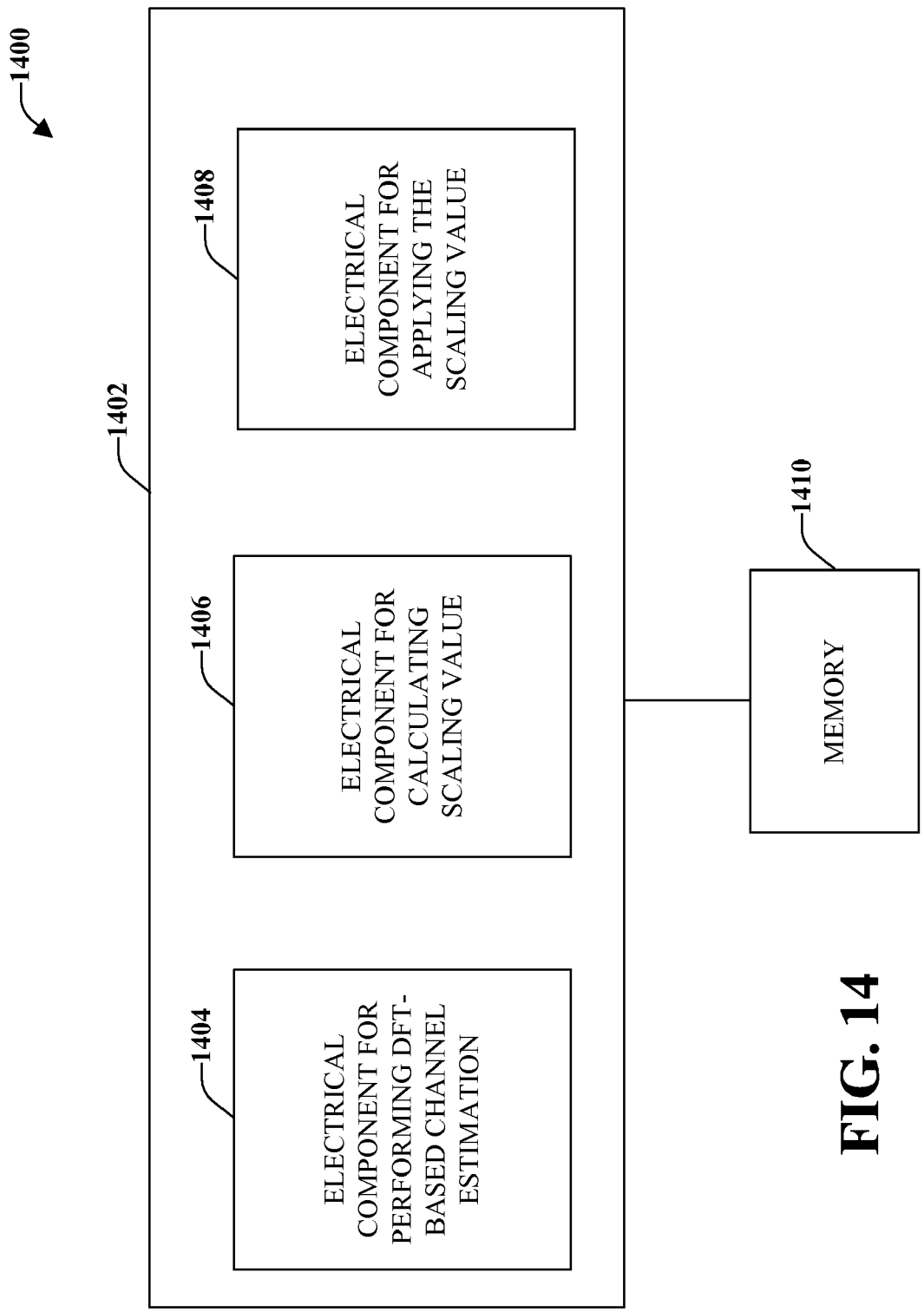
FIG. 14 illustrates an example system that performs channel estimation.

With reference to FIG. 14, illustrated is an example system 1400 that performs channel estimation. System 1400 may reside at least partially within a receiving device (e.g., access point, access terminal). It is to be appreciated that system 1400 is represented as including functional blocks, which may be functional blocks that represent functions implemented by a processor, software, or combination thereof (e.g., firmware).

System 1400 includes a logical grouping 1402 of electrical components that can act separately or in conjunction. For instance, logical grouping 1402 may include an electrical component for performing Discrete Fourier Transform (DFT) based channel estimation 1404. The DFT-based channel estimation can be baseline processing that can be performed on each tone in a system bandwidth.

Logical grouping 1402 also includes an electrical component for calculating a scaling value 1406. This scaling value can represents a distortion amount based on the comparison. Each tone in the system bandwidth can have a different scaling value. Also included in logical grouping 1402 is an electrical component for electively applying the scaling value 1408, which can mitigate the distortion amount. The scaling value can be applied locally on a subset of tones that experience distortion, such as edge tones, center tones, or other tones.

In accordance with some aspects, logical grouping 1402 includes an electrical component for pre-measuring one or more scaling coefficients and an electrical component for storing the one or more scaling coefficients for use at a later time to scale the output of the DFT-based channel estimation.

According to other aspects, logical grouping 1402 includes an electrical component for utilizing a probe signal as an input to an DFT-based channel estimator. The probe signal is a typical channel frequency response. Also included in logical grouping 1402 can be an electrical component for calculating an output of the DFT-based channel estimator and an electrical component for taking an inverse of the output. An electrical component for normalizing the inverse of the output and an electrical component for applying MMSE scaling to obtain the scaling can also be included in logical grouping. In accordance with some aspects, one or more scaling values are pre-measured and stored.

Additionally, system 1400 can include a memory 1410 that retains instructions for executing functions associated with electrical components 1404, 1406, and 1408 or other components. While shown as being external to memory 1410, it is to be understood that one or more of electrical components 1404, 1406, and 1408 may exist within memory 1410.

Figure 15:
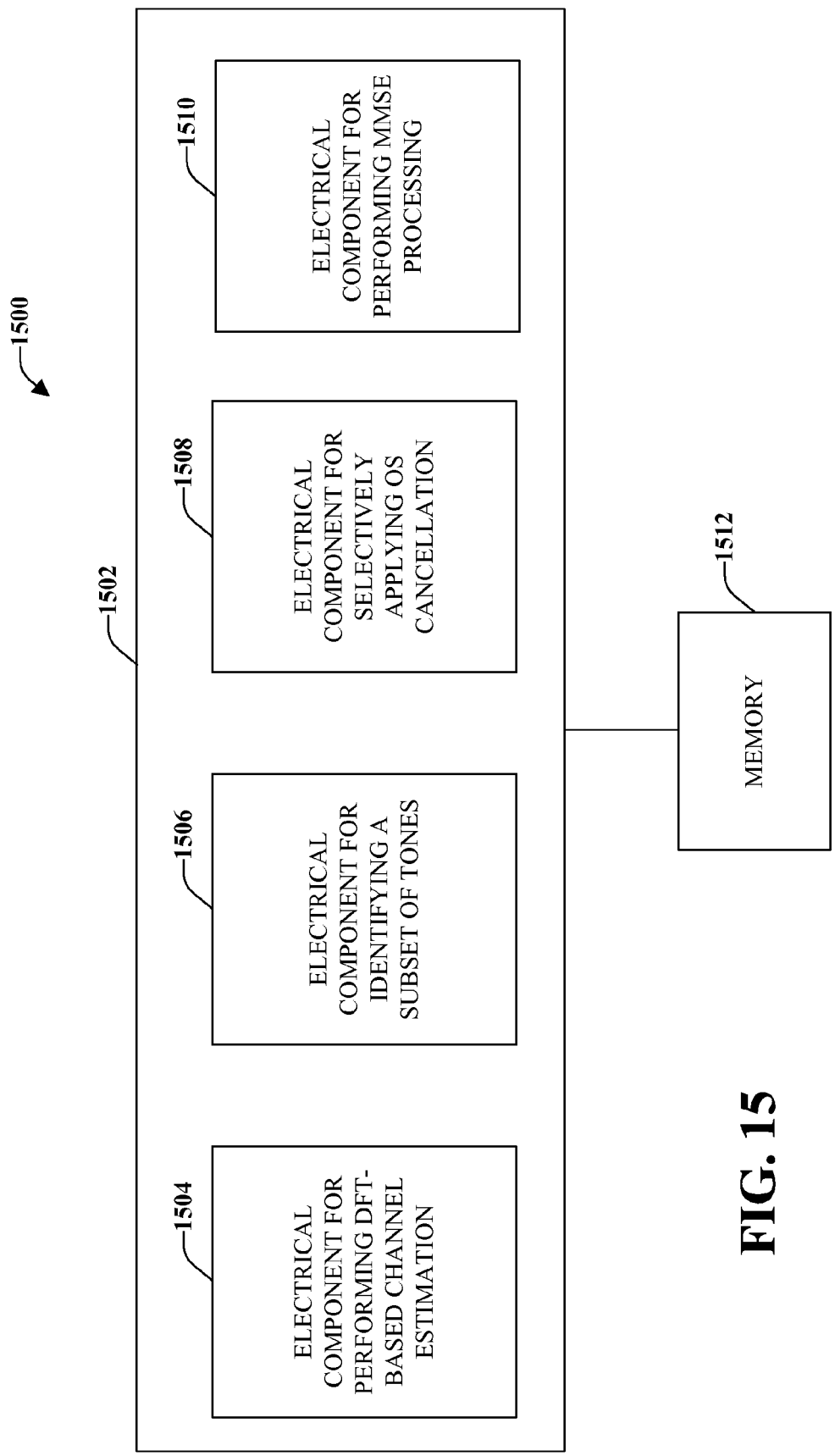
FIG. 15 illustrates an example system that performs channel estimation.

With reference to FIG. 15, illustrated is an example system 1500 that performs channel estimation. System 1500 may reside at least partially within a receiving device (e.g., access point, access terminal). It is to be appreciated that system 1400 is represented as including functional blocks, which may be functional blocks that represent functions implemented by a processor, software, or combination thereof (e.g., firmware).

System 1500 includes a logical grouping 1502 of electrical components that can act separately or in conjunction. For instance, logical grouping 1502 may include an electrical component for performing Discrete Fourier Transform (DFT) based channel estimation 1504 on each tone in a system bandwidth. Logical grouping also includes an electrical component for means for identifying a subset of tones for which DFT-based estimation is deemed unreliable 1506. The tones for which DFT is deemed unreliable are edge tones, center tones, or combinations thereof.

Further, logical grouping 1502 includes an electrical component for selectively applying orthogonal sequence (OS) cancellation. The OS cancellation is applied if excessive OS detected. If excessive OS is not detected, OS cancellation is not applied. Also included is an electrical component for performing MMSE processing on the subset of tones 1510. The MMSE processing produces an estimate that overwrites the DFT-based channel estimation. In accordance with some aspects, the MMSE processing is performed offline and retained for a few representative SNR values and/or channel lengths.

In accordance with some aspects, the OS cancellation procedure is pre-calculated off-line and resulting metrics stored for later application based on a measured SNR and/or a measured channel length.

Additionally, system 1500 can include a memory 1510 that retains instructions for executing functions associated with electrical components 1504, 1506, and 1508 or other components. While shown as being external to memory 1510, it is to be understood that one or more of electrical components 1504, 1506, and 1508 may exist within memory 1510.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method of channel estimation, comprising:
performing baseline Discrete Fourier Transform (DFT) based channel estimation on each tone in a system bandwidth to produce an output;
calculating a scaling value that represents a distortion amount, wherein calculating the scaling value comprises utilizing a probe signal as an input to a DFT-based channel estimator, wherein the probe signal is a typical channel frequency response, calculating an output of the DFT-based channel estimator, taking an inverse of the output, normalizing the inverse of the output, and applying MMSE scaling to obtain the scaling value; and
applying the scaling value to the output to mitigate the distortion amount.

2. The method of claim 1, wherein each tone in the system bandwidth has a different scaling value.

3. The method of claim 1, wherein the scaling value is applied locally on a subset of tones that experience distortion.

4. The method of claim 1, further comprising:
pre-measuring and storing one or more scaling values.

5. A wireless communications apparatus, comprising:
a memory that retains instructions related to performing baseline Discrete Fourier Transform (DFT) based channel estimation on each tone in a system bandwidth to produce an output, calculating a scaling value that represents a distortion amount, and selectively applying the scaling value to the output to mitigate the distortion amount, wherein calculating the scaling value comprises utilizing a probe signal as an input to a DFT-based channel estimator, wherein the probe signal is a typical channel frequency response, calculating an output of the DFT-based channel estimator, taking an inverse of the output, normalizing the inverse of the output, and applying MMSE scaling to obtain the scaling values; and
a processor, coupled to the memory, configured to execute the instructions retained in the memory.

6. The wireless communications apparatus of claim 5, wherein each tone in the system bandwidth has a different scaling value.

7. The wireless communications apparatus of claim 5, wherein the scaling value is applied locally on a subset of tones that experience distortion.

8. The wireless communications apparatus of claim 5, the memory further retains instructions related to pre-measuring one or more scaling coefficients and storing the one or more scaling coefficients.

9. An apparatus, comprising:
means for performing baseline Discrete Fourier Transform (DFT) based channel estimation to each tone in a system bandwidth to obtain an output;
means for determining a scaling value that represents a distortion amount, wherein the means for determining the scaling value comprises means for utilizing a probe signal as an input to a DFT-based channel estimator, wherein the probe signal is a typical channel frequency response, means for calculating an output of the DFT-based channel estimator, means for taking an inverse of the output, means for normalizing the inverse of the output, and means for applying MMSE scaling to obtain the scaling coefficients; and
means for applying the scaling value to the output to mitigate the distortion amount.

10. The apparatus of claim 9, wherein each tone in the system bandwidth has a different scaling value.

11. The apparatus of claim 9, wherein the scaling value is applied locally on a subset of tones that experience distortion.

12. The apparatus of claim 9, further comprising:
means for pre-measuring the desired output to obtain one or more scaling coefficients; and
means for storing the one or more scaling coefficients for use at a later time to scale the output of the DFT-based channel estimation.

13. A non-transitory computer program product, comprising:
a computer-readable medium comprising:
code for causing a computer to perform baseline Discrete Fourier Transform (DFT) channel estimation to each tone in a system bandwidth to produce an output;
code for causing the computer to calculate a scaling value that represents a distortion amount, wherein the code for causing the computer to calculate the scaling value comprises code for causing the computer to utilize a probe signal as an input to a DFT-based channel estimator, wherein the probe signal is a typical channel frequency response, code for causing the computer to calculate an output of the DFT-based channel estimator, code for causing the computer to apply an inverse of the output, code for causing the computer to normalize the inverse of the output, and code for causing the computer to apply MMSE scaling to obtain a desired output; and
code for causing the computer to apply the scaling value to the produced output to mitigate the distortion amount.

14. The computer program product of claim 13, wherein each tone in the system bandwidth has a different scaling value.

15. The computer program product of claim 13, wherein the scaling value is applied locally on a subset of tones that experience distortion.

16. The computer program product of claim 13, the computer-readable medium further comprising:
code for causing the computer to pre-measure the desired output to obtain one or more scaling coefficients; and code for causing the computer to store the one or more scaling coefficients for use at a later time to scale the output of the DFT-based channel estimation.

17. At least one processor configured to perform channel estimation, comprising:
a first module for performing baseline Discrete Fourier Transform (DFT) based channel estimation to each tone in a system bandwidth to create an output;
a second module for calculating a scaling value that represents a distortion amount;
a third module for selectively applying the scaling value to the created output to mitigate the distortion amount;
a fourth module for utilizing a probe signal as an input to a DFT-based channel estimator, wherein the probe signal is a typical channel frequency response;
a fifth module for calculating an output of the DFT-based channel estimator;
a sixth module for taking an inverse of the output;
a seventh module for normalizing the inverse of the output; and
an eighth module for applying MMSE scaling to obtain a desired output.

18. The at least one processor of claim 17, wherein each tone in the system bandwidth has a different scaling value.

19. The at least one processor of claim 17, wherein the scaling value is applied locally on a subset of tones that experience distortion.

20. The at least one processor of claim 17, further comprising:
a fourth module for pre-measuring the desired output to obtain one or more scaling coefficients; and
a fifth module for storing the one or more scaling coefficients for later use to scale the output of the DFT-based channel estimation.

21. A method for channel estimation, comprising:
performing Discrete Fourier Transform (DFT) based channel estimation on each tone in a system bandwidth;
identifying a subset of tones for which DFT-based estimation is deemed unreliable;
applying orthogonal sequence (OS) cancellation; and
performing MMSE processing on the subset of tones.

22. The method of claim 21, wherein OS cancellation is applied if excessive OS detected.

23. The method of claim 21, wherein OS cancellation is not applied if there is not excessive OS detected.

24. The method of claim 21, wherein MMSE processing is not performed on the tones for which DFT-based estimation is deemed reliable.

25. The method of claim 21, wherein the MMSE processing produces an estimate that overwrites the DFT-based channel estimation.

26. The method of claim 21, wherein the MMSE processing is performed offline and retained for a few representative SNR values, channel lengths, or combinations thereof.

27. The method of claim 21, wherein the OS cancellation procedure is pre-calculated off-line and resulting metrics stored for later application based on a measured SNR, a measured channel length, or combinations thereof.

28. The method of claim 21, wherein the tones for which DFT-based estimation is deemed unreliable are edge tones.

29. The method of claim 21, wherein the tones for which DFT-based estimation is deemed unreliable are center tones.

30. A wireless communications apparatus, comprising:
a memory that retains instructions related to performing Discrete Fourier Transform (DFT) based channel estimation on each tone in a system bandwidth, identifying a subset of tones for which DFT-based estimation is deemed unreliable, selectively applying orthogonal sequence (OS) cancellation, and performing MMSE processing on the subset of tones; and
a processor, coupled to the memory, configured to execute the instructions retained in the memory.

31. The wireless communications apparatus of claim 30, wherein OS cancellation is applied if excessive OS is detected.

32. The wireless communications apparatus of claim 30, wherein OS cancellation is not applied if there is not excessive OS detected.

33. The wireless communications apparatus of claim 30, wherein the MMSE processing produces an estimate that overwrites the DFT-based channel estimation.

34. The wireless communications apparatus of claim 30, wherein the MMSE processing is performed offline and retained for a few representative SNR values, channel lengths, or combinations thereof.

35. The wireless communications apparatus of claim 30, wherein the OS cancellation procedure is pre-calculated off-line and resulting metrics stored for later application based on a measured SNR, a measured channel length, or combinations thereof.

36. The wireless communications apparatus of claim 30, wherein the tones for which DFT-based estimation is deemed unreliable are edge tones, center tones, or combinations thereof.

37. An apparatus, comprising:
means for performing Discrete Fourier Transform (DFT) based channel estimation on each tone in a system bandwidth;
means for identifying a subset of tones for which DFT-based estimation is deemed unreliable;
means for selectively applying orthogonal sequence (OS) cancellation; and
means for performing MMSE processing on the subset of tones.

38. The apparatus of claim 37, wherein OS cancellation is applied if excessive OS detected.

39. The apparatus of claim 37, wherein OS cancellation is not applied if there is not excessive OS is detected.

40. The apparatus of claim 37, wherein the MMSE processing produces an estimate that overwrites the DFT-based channel estimation.

41. The apparatus of claim 37, wherein the MMSE processing is performed offline and retained for a few representative SNR values, channel lengths, or combinations thereof.

42. The apparatus of claim 37, wherein the OS cancellation procedure is pre-calculated off-line and resulting metrics stored for later application based on a measured SNR, a measured channel length, or combinations thereof.

43. The apparatus of claim 37, wherein the tones for which DFT-based estimation is deemed unreliable are edge tones, center tones, or combinations thereof.

44. A non-transitory computer program product, comprising:
a computer-readable medium comprising:
code for causing a computer to perform Discrete Fourier Transform (DFT) based channel estimation on each tone in a system bandwidth;
code for causing the computer to identify a subset of tones for which DFT-based estimation is deemed unreliable;
code for causing the computer to selectively apply orthogonal sequence (OS) cancellation; and
code for causing the computer to perform MMSE processing on the subset of tones.

45. The computer program product of claim 44, wherein OS cancellation is applied if excessive OS is detected.

46. The computer program product of claim 44, wherein the MMSE processing produces an estimate that overwrites the DFT-based channel estimation.

47. At least one processor configured to perform channel estimation, comprising:
- a first module for performing Discrete Fourier Transform (DFT) channel estimation on each tone in a system bandwidth;
- a second module for identifying a subset of tones for which DFT-based estimation is deemed unreliable;
- a third module for applying orthogonal sequence (OS) cancellation if excessive OS is detected; and
- a fourth module for performing MMSE processing on the subset of tones for which DFT-based channel estimation is not reliable.

48. The at least one processor of claim 47, wherein the MMSE processing is performed offline and retained for a few representative SNR values, channel lengths, or combinations thereof.

* * * * *